US012395263B2

(12) United States Patent
Tambasco et al.

(10) Patent No.: US 12,395,263 B2
(45) Date of Patent: Aug. 19, 2025

(54) WAVELENGTH DIVISION MULTIPLEXING ARCHITECTURE BASED ON INTEGRATED BRAGG AND ADIABATIC TE0 MODE ADD/DROP FILTER

(71) Applicant: Cisco Technology, Inc., San Jose, CA (US)

(72) Inventors: Jean-Luc Joseph Tambasco, Macungie, PA (US); Dominic Francis Siriani, Souderton, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 195 days.

(21) Appl. No.: 18/096,128

(22) Filed: Jan. 12, 2023

(65) Prior Publication Data

US 2024/0243832 A1    Jul. 18, 2024

(51) Int. Cl.
*H04J 14/02* (2006.01)
*H04B 10/294* (2013.01)
(Continued)

(52) U.S. Cl.
CPC ........ *H04J 14/0201* (2013.01); *H04B 10/294* (2013.01); *H04B 10/25* (2013.01);
(Continued)

(58) Field of Classification Search
CPC .... H04J 14/0201; H04J 14/0307; H04J 14/02; H04J 14/04; H04B 10/294; H04B 10/25;
(Continued)

(56) References Cited

U.S. PATENT DOCUMENTS 11,635,570 B1    4/2023   Thompson
11,747,559 B2    9/2023   Bian
(Continued)

FOREIGN PATENT DOCUMENTS

| CN | 105866893 A | 1/2019 |
| WO | 2018014365 A1 | 1/2018 |
| WO | 2022062676 A1 | 3/2022 |

OTHER PUBLICATIONS

Shi et al, CN107167873A, Sep. 2017, Chinese Patent Office, All Document. (Year: 2017).*

(Continued)

*Primary Examiner* — Dibson J Sanchez
(74) *Attorney, Agent, or Firm* — Edell, Shapiro & Finnan, LLC

(57) ABSTRACT

A method and apparatus are provided. The method includes receiving, at a $TE_0$ mode add/drop filter, a $TE_0$ mode optical signal having a first wavelength and a second wavelength, and transmitting, from the $TE_0$ mode add/drop filter, the $TE_0$ mode optical signal having the first wavelength and the second wavelength towards a Bragg grating, without converting the $TE_0$ mode optical signal having the first wavelength and the second wavelength to another mode. The method further includes receiving, at the $TE_0$ mode add/drop filter, a reflected $TE_1$ mode optical signal having the first wavelength from the Bragg grating, and transmitting, from the $TE_0$ mode add/drop filter, the reflected $TE_1$ mode optical signal having the first wavelength towards a photodetector, without converting the reflected $TE_1$ mode optical signal having the first wavelength to another mode.

20 Claims, 17 Drawing Sheets

(51) Int. Cl.
   *H04B 10/25*     (2013.01)
   *H04B 10/2581*   (2013.01)
   *H04J 14/04*     (2006.01)

(52) U.S. Cl.
   CPC .......... *H04B 10/2581* (2013.01); *H04J 14/02* (2013.01); *H04J 14/0307* (2023.08); *H04J 14/04* (2013.01)

(58) Field of Classification Search
   CPC ........ H04B 10/2581; G02B 2006/1215; G02B 6/12007; G02B 6/124; G02B 6/14
   USPC .................................. 398/43–103, 140–172
   See application file for complete search history.

(56) References Cited

U.S. PATENT DOCUMENTS

| | | | |
|---|---|---|---|
| 12,158,607 B2 | 12/2024 | Yamashita et al. | |
| 2004/0258357 A1* | 12/2004 | De Barros | G02B 6/02085 385/28 |
| 2015/0104128 A1 | 4/2015 | Oka et al. | |
| 2015/0338577 A1* | 11/2015 | Shi | G02B 6/125 385/11 |
| 2018/0267237 A1* | 9/2018 | Oonawa | G02B 6/12004 |
| 2018/0284348 A1 | 10/2018 | Lin | |
| 2018/0314005 A1 | 11/2018 | Lin et al. | |
| 2019/0222309 A1 | 7/2019 | Gross et al. | |
| 2019/0243066 A1 | 8/2019 | Mahgerefteh et al. | |
| 2019/0384003 A1 | 12/2019 | Painchaud et al. | |
| 2020/0116939 A1* | 4/2020 | Wang | G02B 6/12007 |
| 2021/0109281 A1 | 4/2021 | Ling et al. | |
| 2023/0224040 A1* | 7/2023 | Lin | H04B 10/2519 398/147 |
| 2023/0268718 A1* | 8/2023 | Guo | G02F 1/21 372/20 |

OTHER PUBLICATIONS

Liu et al, Four-Channel CWDM (de)Multiplexers Using Cascaded Multimode Waveguide Gratings, Feb. 2020, IEEE, All Document. (Year: 2020).*

Xiao et al, Integrated Bragg Grating Filter With Reflection Light Dropped via Two Mode Conversions, May 2019, JOLWT, All Document. (Year: 2019).*

Jiang et al, Silicon lateral-apodized add-drop filter for on-chip optical interconnection, Oct. 2017, Applied Optics, vol. 56 No. 30, All Document. (Year: 2017).*

Shi, W., et al., "Silicon photonic Bragg-grating couplers for optical communications," Invited Paper, Proceedings of SPIE—The International Society for Optical Engineering, https://www.researchgate.net/publication/269323655_Silicon_photonic_Bragg-grating_couplers_for_optical_communications, Feb. 2014, 13 pages.

Okayama, H., et al., "Silicon wire waveguide TE0/TE1 mode conversion Bragg grating with resonant cavity section," Optics Express, Research Article, vol. 25, No. 14, https://opg.optica.org/oe/fulltext.cfm?uri=oe-25-14-16672&id=369014, Jul. 2017, 9 pages.

Qiu, H., et al., "Silicon add-drop filter based on multimode Bragg sidewall gratings and adiabatic couplers," Journal of Lightwave Technology, vol. 35, No. 9, https://ieeexplore.ieee.org/document/7851086/authors#authors, Feb. 2017, 5 pages.

Park, T., et al., "Optimization of Tilted Bragg Grating Tunable Filters Based on Polymeric Optical Waveguides," Current Optics and Photonics, vol. 1, No. 3, https://doi.org/10.3807/COPP.2017.1.3.214, Jun. 2017, 7 pages.

Jafari, O., et al., Mode-conversion-based silicon photonic modulator loaded by a combination of lateral and Interleaved p-n junctions, Research Article, vol. 9, No. 4, Photonics Research, https://doi.org/10.1364/PRJ.414400, Apr. 2021, 6 pages.

Wang, X., et al., "Hitless and gridless reconfigurable optical add drop (de)multiplexer based on looped waveguide sidewall Bragg gratings on silicon," Research Article, vol. 28, No. 10, Optics Express, https://opg.optica.org/oe/fulltext.cfm?uri=oe-28-10-14461&id=431329, May 2020, 15 pages.

Xie, S., et al., "Add-drop filter with complex waveguide Bragg grating and multimode interferometer operating on arbitrarily spaced channels," Optics Letters, vol. 43, No. 24, https://opg.optica.org/ol/abstract.cfm?uri=ol-43-24-6045, Dec. 2018, 4 pages.

Qiu, H., et al., "Silicon band-rejection and band-pass filter based on asymmetric Bragg sidewall gratings in a multimode waveguide," Optics Letters, vol. 41, Issue 11, https://opg.optica.org/ol/abstract.cfm?uri=ol-41-11-2450, Jun. 2016, 1 page.

* cited by examiner 1200
(CONTINUED)

(FROM STEP 1220 OF FIG.12A)

RECEIVE $TE_0$ MODE OPTICAL SIGNAL HAVING FIRST WAVELENGTH AND SECOND WAVELENGTH (λ1, λ2) FROM $TE_0$ MODE ADD/DROP FILTER ON BUS WAVEGUIDE (SiN) — 1230

TRANSMIT NON-REFLECTED (PASS-BAND) $TE_0$ MODE OPTICAL SIGNAL HAVING SECOND WAVELENGTH (λ2) TOWARDS SECOND $TE_0$ MODE ADD/DROP FILTER — 1235 → (TO TRANSITION)

TRANSMIT REFLECTED (DROP-BAND) $TE_1$ MODE OPTICAL SIGNAL HAVING FIRST WAVELENGTH (λ1) TO $TE_0$ MODE ADD/DROP FILTER ON BUS WAVEGUIDE (SiN) — 1240

(TO STEP 1250 OF FIG.12A)

FIG.12B

WAVELENGTH DIVISION MULTIPLEXING ARCHITECTURE BASED ON INTEGRATED BRAGG AND ADIABATIC TE0 MODE ADD/DROP FILTER

TECHNICAL FIELD

Embodiments described herein are directed to a photonic device, and specifically to a wavelength division multiplexing architecture including an integrated Bragg grating, an adiabatic $TE_0$ mode add/drop filter, and a $TE_1 \rightarrow TE_0$ mode converter.

BACKGROUND

A photonic device is designed to have components with minimal loss, footprint and, if possible, complexity. Propagation loss, back-reflection, high power handling, extinction ratio and yield all, ultimately, have an impact on the optical link performance of the device.

One component of interest is a mode multiplexer (often referred to as a "modemux"). A modemux is a general purpose photonic component, which can be used, for example, with a polarization rotator to form a polarization splitter rotator (PSR), or in a receiver's integrated wavelength division multiplexing (WDM) filter used in, e.g., the O-band. Such a filter preferably meet desired specifications including accurate channel center and width, as well as steep channel edge roll off and extinction ratio. Some platforms use a set of integrated Bragg gratings for the core filtering process. In some implementations, these gratings may be combined with supporting adiabatic components including adiabatic bends and adiabatic interlayer transitions.

A photonic filter is also characterized by insertion loss (IL) and return loss (RL). Link budget, which is related directly to IL, is a premium on the receive path (compared to the transmit path). The RL of a given receiver is impacted not only by filter design, but also by fiber couplers, photodetectors (e.g., a GePD), variable optical attenuators (VOAs), Si routing, and potentially a PSR.

One integrated Bragg WDM filter architecture uses back-reflection to form a spectral reject or "drop" band, and forward transmission as a spectral "pass" band. Using back-reflection to form a drop band, while producing excellent filtering performance, is clearly at odds with RL. In this architecture, receiver RL is equal to approximately four times the cross-talk of an individual adiabatic modemux. For example, a −30 dB cross-talk modemux (which is already considered very good for a modemux) used in such an integrated WDM filter result in −24 dB of RL, which may fall short of a desired still lower RL. Estimates of the cross-talk to comfortably meet the return loss specification on a receiver place the required cross-talk of the adiabatic modemux at approximately less than −36 dB.

A typical modemux converts $TE_1$ to $TE_0$ of an isolated waveguide. However, converting $TE_1$ to $TE_0$ to avoid cross-talk can be challenging.

BRIEF DESCRIPTION OF THE DRAWINGS

FIGS. 12A-12C illustrate a flowchart showing a series of operations for processing light with a Bragg-based demultiplexer of FIG. 8, according to an example embodiment.

DETAILED DESCRIPTION

Overview

Figure 1:
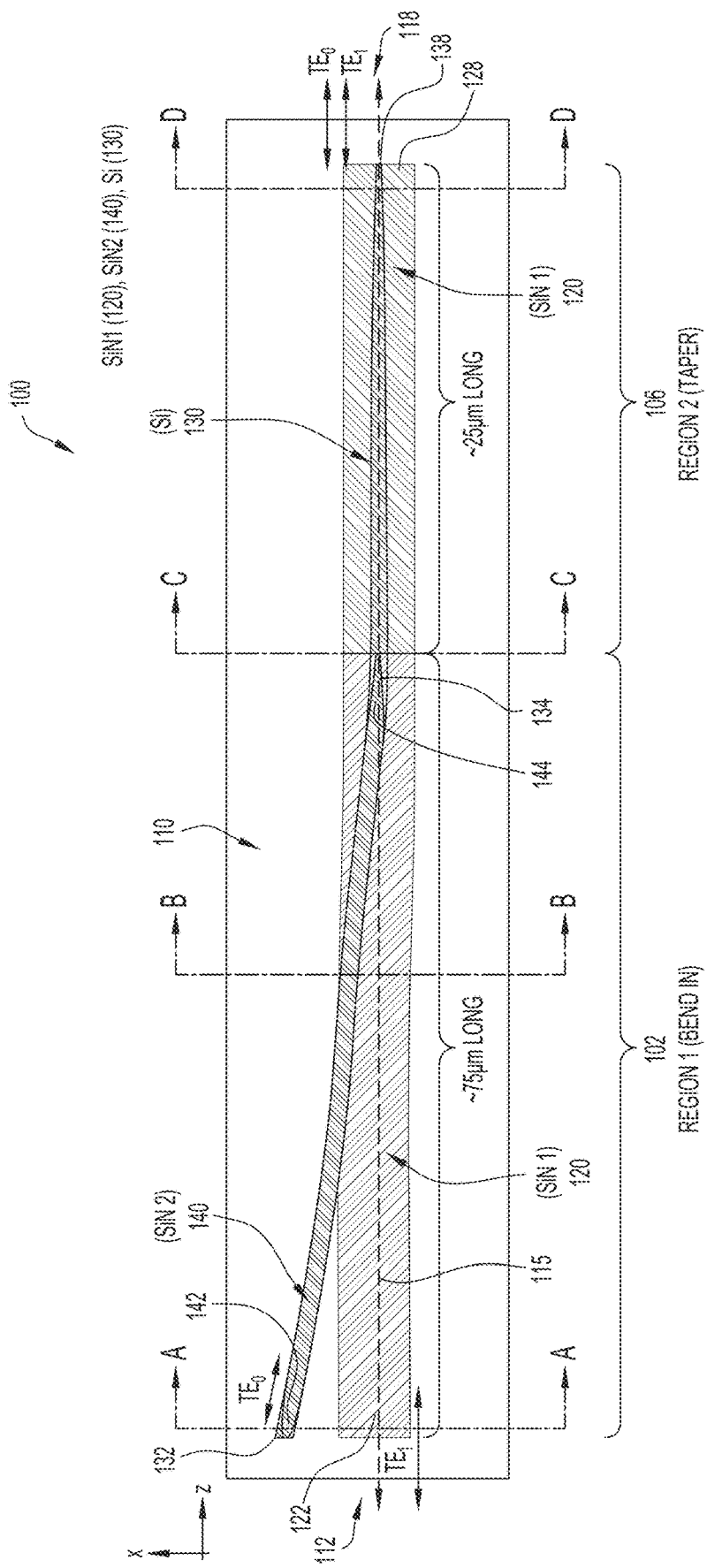
FIG. 1 shows a plan view of a modemux, according to an example embodiment.

Presented herein is a method that includes receiving, at a $TE_0$ mode add/drop filter, a $TE_0$ mode optical signal having a first wavelength ($\lambda_1$) and a second wavelength ($\lambda_2$) on a lower waveguide, and transmitting, from the $TE_0$ mode add/drop filter, the $TE_0$ mode optical signal having the first wavelength and the second wavelength ($\lambda_1$, $\lambda_2$) towards a Bragg grating on a bus waveguide disposed above the lower waveguide, without converting the $TE_0$ mode optical signal having the first wavelength and the second wavelength ($\lambda_1$, $\lambda_2$) to another mode (e.g., $TE_1$). The method further includes receiving, at the $TE_0$ mode add/drop filter, a reflected (drop-band) $TE_1$ mode optical signal having the first wavelength ($\lambda_1$) from the Bragg grating on the bus waveguide, and transmitting, from the $TE_0$ mode add/drop filter, the reflected (drop-band) $TE_1$ mode optical signal ($\lambda_1$) towards a photodetector on the bus waveguide, without converting the reflected (drop-band) $TE_1$ mode optical signal ($\lambda_1$) to another mode (e.g., $TE_0$).

According to an aspect, the method further includes mode multiplexing, by the $TE_0$ mode add/drop filter, the $TE_0$ mode optical signal having the first wavelength and the second wavelength ($\lambda_1$, $\lambda_2$) with the reflected (drop-band) $TE_1$ mode optical signal having the first wavelength ($\lambda_1$). According to an aspect, the method includes receiving, by a $TE_1 \rightarrow TE_0$ mode converter, the (drop-band) $TE_1$ mode optical signal having the first wavelength ($\lambda_1$) from the $TE_0$ add/drop filter on the bus waveguide, converting, by the $TE_1 \rightarrow TE_0$ mode converter, the (drop-band) $TE_1$ mode optical signal having the first wavelength ($\lambda_1$) to a (drop-band) $TE_0$ mode optical signal having the first wavelength ($\lambda_1$), and transmitting, from the $TE_1 \rightarrow TE_0$ mode converter, the converted (drop-band) $TE_0$ mode optical signal at the first wavelength ($\lambda_1$) to the photodetector. According to an aspect, the method further includes transmitting, from the Bragg grating, a non-reflected (pass-band) $TE_0$ mode optical signal having the second wavelength ($\lambda_2$) towards a second $TE_0$ mode add/drop filter.

According to another aspect, another method is provided. The method includes passing an optical signal through a plurality of $TE_0$ mode add/drop filters, reflecting respective wavelengths of the optical signal using respective Bragg gratings, and detecting powers of the respective wavelengths using respective photodetectors. According to an aspect, each $TE_0$ mode add/drop filter in the plurality of $TE_0$ mode add/drop filters passes the optical signal without converting the optical signal to a different mode. According to an aspect, at least one $TE_0$ mode add/drop filter in the plurality of $TE_0$ mode add/drop filters is an adiabatic $TE_0$ mode add/drop filter.

According to yet another aspect, presented herein is an apparatus including a $TE_0$ mode add/drop filter, and a Bragg grating connected with the $TE_0$ mode add/drop filter. The $TE_0$ mode add/drop filter is configured to receive a $TE_0$ mode optical signal having a first wavelength ($\lambda_1$) and a second wavelength ($\lambda_2$) on a lower waveguide, and transmit the $TE_0$ mode optical signal having the first wavelength and the second wavelength ($\lambda_1$, $\lambda_2$) towards the Bragg grating on a bus waveguide disposed above the lower waveguide, without converting the $TE_0$ mode optical signal having the first wavelength and the second wavelength ($\lambda_1$, $\lambda_2$) to another mode ($TE_1$). The $TE_0$ mode add/drop filter is further configured to receive a reflected (drop-band) $TE_1$ mode optical signal having the first wavelength ($\lambda_1$) from the Bragg grating on the bus waveguide, and transmit the reflected (drop-band) $TE_1$ mode optical signal having the first wavelength ($\lambda_1$) towards the photodetector on the bus waveguide, without converting the reflected (drop-band) $TE_1$ mode optical signal having the first wavelength ($\lambda_1$) to another mode ($TE_0$).

According to an aspect, the $TE_0$ mode add/drop filter of the apparatus is an adiabatic $TE_0$ mode add/drop filter. According to an aspect, the lower waveguide is a single-mode waveguide comprised of silicon (Si) and the bus waveguide is a multimode waveguide comprised of silicon nitride (SiN). According to an aspect, the $TE_0$ mode add/drop filter further establishes a pseudo-symmetry about a longitudinal axis of the bus waveguide (SiN) to prevent $TE_1$-$TM_0$ mode hybridization of optical signals that traverse the bus waveguide (SiN). According to an aspect, the $TE_0$ mode add/drop filter is configured to mode multiplex the $TE_0$ mode optical signal having the first wavelength and the second wavelength ($\lambda_1$, $\lambda_2$) with the reflected (drop-band) $TE_1$ mode optical signal having the first wavelength ($\lambda_1$).

According to an aspect, the apparatus further includes further a $TE_1 \rightarrow TE_0$ mode converter configured to receive the (drop-band) $TE_1$ mode optical signal having the first wavelength ($\lambda_1$) from the $TE_0$ mode add/drop filter, convert the (drop-band) $TE_1$ mode optical signal having the first wavelength ($\lambda_1$) to a (drop-band) $TE_0$ mode optical signal having the first wavelength ($\lambda_1$), and transmit the converted (drop-band) $TE_0$ mode optical signal having the first wavelength ($\lambda_1$) to the photodetector. According to an aspect, the Bragg grating is configured to transmit a non-reflected (pass-band) $TE_0$ mode optical signal having the second wavelength ($\lambda_2$) towards a second $TE_0$ add/drop filter.

Example Embodiments

Described below is a photonic component or device that operates to strip out or filter TE0 mode light from a multimode waveguide. In one embodiment, a "bus" waveguide comprised of silicon nitride is disposed on a layer of a substrate and remains substantially unchanged along the length of the device. The bus waveguide has a substantially rectangular shape that does not translate (i.e., bend, shift or angle toward or away from a longitudinal axis). The bus waveguide may support at least $TE_0$, $TE_1$, and $TM_0$ guided modes. In one implementation, a lower waveguide comprised of silicon is disposed on a lower layer of the substrate below the bus waveguide, and an upper waveguide comprised of silicon nitride is disposed on an upper layer of the substrate above the bus waveguide. The lower waveguide and the upper layer, in a bend-in region in a first portion of the device, follow substantially the same paths and are translated from non-overlapping positions to overlapping positions with respect to the bus waveguide. The upper and lower waveguides are provided to create a "pseudo-symmetry", which avoids $TE_1$-$TM_0$ mode hybridization. The lower waveguide may taper towards one end of the bend-in region and end. A taper region characterizes a second portion of the device in which the upper waveguide extends toward an end of the device and tapers toward that end.

In a second implementation, the upper waveguide is eliminated and the lower waveguide is disposed further away from the bus waveguide. This increased separation reduces the $TM_0$ index to avoid mode hybridization.

Those skilled in the art will appreciate that the terms "lower" and "upper" are not meant to suggest strict orientation, and are merely meant to denote a relationship between layers or indicate a relative position, not necessarily that one layer is above or below another layer (e.g., in use, the actual orientation of the device may dictate which layer or waveguide may be referred to as an "upper" or "lower" layer or waveguide, such that the described upper layer or waveguide is actually below the lower layer or waveguide).

More specifically, the present disclosure provides a multimode waveguide with an adiabatic $TE_0$ mode add/drop filter in the form of a modemux that takes optical power in the $TE_0$ mode of a high index waveguide, and adiabatically transfers it into the $TE_0$ mode of a lower index, multimode waveguide. The modemux is designed to have low $TE_0$-$TE_1$ cross-talk by ensuring that when the $TE_0$ muxing takes place, either: (1) symmetry is used to negate scattering between even and odd modes, or (2) the effective indices of $TE_0$ (in Si) and $TE_1$ (in SiN) are substantially different (i.e., result in negligible phase-matching between the two modes).

The overall length of the disclosed device is relatively short. A traditional SiN modemux may be on the order of 200-400 μm long, whereas the modemux described herein is either on the order of ~100-120 μm long (e.g., first example embodiment of FIGS. 1 and 2A-2C) or on the order of ~200-250 μm long (e.g., second example embodiment of FIGS. 5A-5B). Thus, the adiabatic modemux of this disclosure has a smaller footprint than many existing modemuxes.

The adiabatic modemux may be used in a WDM filter architecture in the O-band, or in various other applications relating to polarization rotating, multiplexing, $TE_1$ generation and component characterization. A significant challenge in obtaining a viable modemux using this scheme is overcoming unwanted $TE_1$-$TM_0$ mode hybridization. Notably, this challenge can be overcome using the modemux described herein.

As those skilled in the art will come to understand, the photonic component of the present disclosure does not work in the conventional sense, in that the multi-layer modemux transmits $TE_1$ as $TE_1$ (instead of converting $TE_1$ to $TE_0$ like a standard modemux does), and multiplexes $TE_0$ onto a $TE_1$-carrying waveguide.

Figure 2A:
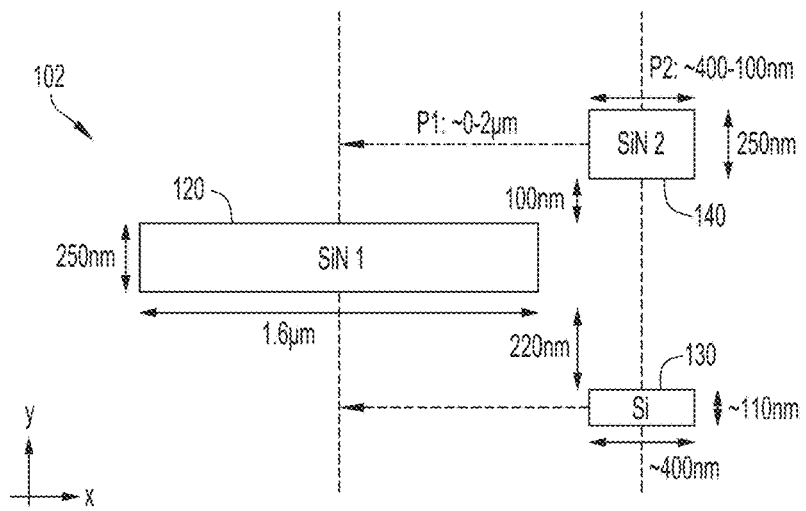
FIGS. 2A, 2B, and 2C show, respectively, cross-sectional views at A-A, B-B, and C-C of the modemux shown in FIG. 1, according to an example embodiment.
Figure 2B:
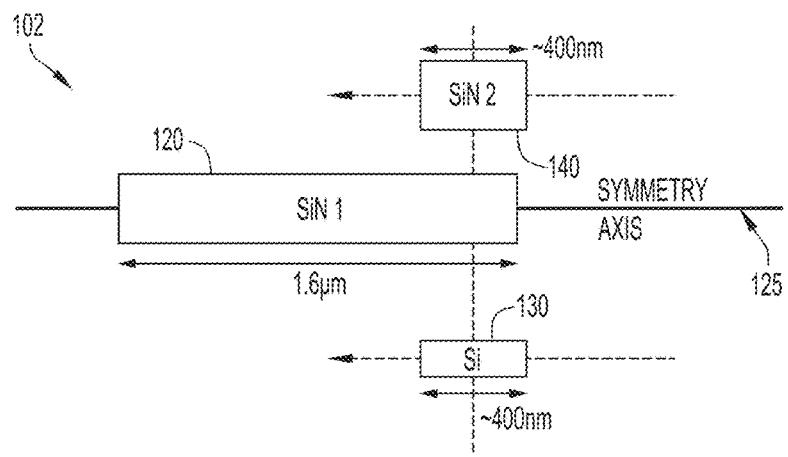
Figure 2C:
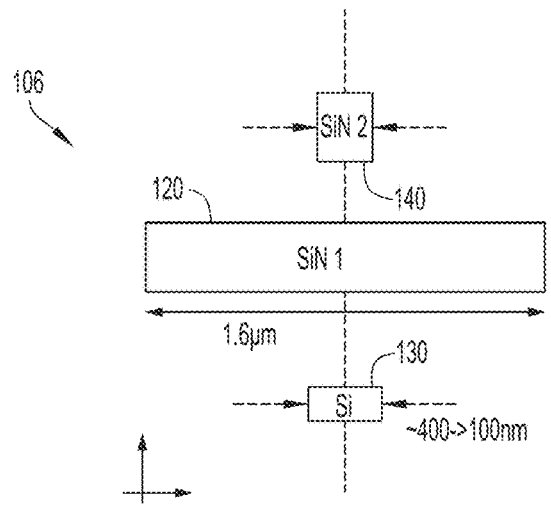

Reference is now made to the figures, beginning with FIG. 1, which shows a plan view of a modemux 100, according to an example embodiment, and to FIGS. 2A, 2B and 2C, which show, respectively, cross-sectional views taken at A-A, B-B, and C-C of modemux 100 shown in FIG. 1, according to an example embodiment. Modemux 100 comprises two regions: a first region 102 (or "bend in" region) and a second region 106 (or "taper" region). Those skilled in the art will appreciate, however, that these denoted regions are merely meant to help describe the modemux 100, and are not meant to suggest any clear or specific boundaries between different regions, or that any particular functionality is performed exclusively in any given region.

Modemux 100 is fabricated within/on a substrate 110 (e.g., silicon dioxide) that includes a first edge 112 and a second edge 118. As shown in FIG. 1, modemux 100 includes a bus waveguide 120 that is disposed in/on the substrate 110, and extends between the first edge 112 and the second edge 118 (e.g., along a longitudinal axis 115 in the z-axis direction). The bus waveguide 120 has a first end 122 (at first edge 112 of substrate 110) and a second end 128 (at second edge 118 of substrate 110). In an example embodiment, bus waveguide 120 is comprised of silicon nitride (denoted as "SiN 1" in the figures), and has a substantially rectangular cross-section that remains substantially unchanged along its length. The bus waveguide 120 may have a width (in the x-axis direction) of about 1.6 μm, and a thickness (in the y-axis direction) of about 250 nm. The bus waveguide 120 may be bimodal (in TE), thus supporting, at least, both $TE_0$ and $TE_1$ modes.

As shown in FIG. 1, modemux 100 also includes a lower waveguide 130 disposed in/on the substrate 110 below the bus waveguide 120, and an upper waveguide 140 disposed in/on the substrate 110 above the bus waveguide 120. Lower waveguide 130 and upper waveguide 140 extend from first edge 112 towards second edge 118, and at least partially overlie bus waveguide 120. At the first edge 112 of the substrate 110, the lower waveguide 130 has an untapered end 132, and the upper waveguide 140 has a first end 142 that slightly narrows (or tapers) in the x-axis direction (e.g., to better match physical dimensions of prior or follow-on optical components). In an example embodiment, the lower waveguide 130 is comprised of silicon (denoted as "Si" in the figures) and the upper waveguide 140 is comprised of silicon nitride (denoted as "SiN 2" in the figures). The lower waveguide 130 may have a width (in the x-axis direction) that ranges from about 400 nm to 100 nm, and a thickness (in the y-axis direction) of about 110 nm. At the second edge 118 of the substrate 110, the lower waveguide 130 has a tapered end 138 that narrows (or tapers) in the x-axis direction.

The width of the lower waveguide 130 may remain substantially unchanged in (bend in) first region 102, and may gradually narrow or taper in the x-axis direction along the length of (taper) second region 106 (in the z-axis direction, from left to right in FIG. 1). In an example embodiment, the upper waveguide 140 may have a width (in the x-axis direction) that ranges from about 400 nm to 100 nm, and a thickness (in the y-axis direction) of about 250 nm. The width of the upper waveguide 140 may also narrow or taper in the x-axis direction in (bend in) first region 102 at a second end 144 of the upper waveguide 140. The first end 142 and the second end 144 of the upper waveguide 140 and the tapered end 138 of the lower waveguide 130 may have a width (in the x-axis direction) of about 100 nm wide at their respective tips.

In (bend in) first region 102, moving from left to right in FIG. 1, the lower waveguide 130 (Si) and the upper waveguide 140 (SiN 2) both bend in towards the longitudinal axis 115. At cross-section A-A, the lower waveguide 130 and the upper waveguide 140 (at untapered end 132 and first end 142) do not overlap with the bus waveguide 120. From cross-section A-A to cross-section B-B, the lower waveguide 130 and the upper waveguide 140 both translate in the x-axis direction towards the longitudinal axis 115, and begin to partially overlap with the bus waveguide 120. From cross-section B-B to cross-section C-C, the lower waveguide 130 and the upper waveguide 140 both continue translating in the x-axis direction towards the longitudinal axis 115 and both overlap with the bus waveguide 120. In (taper) second region 106, continuing from left to right in FIG. 1, the lower waveguide 130 no longer translates in the x-axis direction. From cross-section C-C to cross section D-D, the lower waveguide 130 overlaps with the bus waveguide 120.

In an example embodiment, the bus waveguide 120, the lower waveguide 130, and the upper waveguide 140 are arranged/patterned/defined on/in a low index (e.g., silicon dioxide) cladding. Also, as shown in FIGS. 2A, 2B and 2C, the lower waveguide 130 and the upper waveguide 140 may be unequally offset from each other with respect to a symmetry axis 125. That is, in an example embodiment, the lower waveguide 130 may be separated from the bus waveguide 120 (in the y-axis direction) by about 220 nm, while the upper waveguide 140 may be separated from the bus waveguide (in the y-axis direction) by about 100 nm.

In this particular implementation, (bend in) first region 102 (between A-A and C-C) may have a length (in the z-axis direction) of about 75 μm, and (taper) second region 106 (between C-C and D-D) may have a length (in the z-axis direction) of about 25 μm. However, these regions or sections of modemux 100 may have different lengths according to other implementations (e.g., as described below with reference to FIGS. 5A and 5B).

FIG. 2A shows (bend in) first region 102 at cross section A-A of FIG. 1, where the untapered end 132 of the lower waveguide 130 and the first end 142 of the upper waveguide 140 do not overlap with the first end 122 of the bus waveguide 120. Bus waveguide 120 (SiN 1) has a width of about 1.6 μm in the x-axis direction, and a thickness of about 250 nm in the y-axis direction. Lower waveguide 130 (Si) has a width of about ~400 nm in the x-axis direction, and a thickness of about 110 nm in the y-axis direction. There is a gap about 220 nm between the bus waveguide 120 (SiN 1) and the lower waveguide 130 (Si). Upper waveguide 140 (SiN 2) has a length of about ~400 nm in the x-axis direction, and a width of about 250 nm in the y-axis direction. There is a gap about 100 nm between the bus waveguide 120 (SiN 1) and the upper waveguide 140 (SiN 2). In (bend in) first region 102, the lower waveguide 130 (Si) and the upper waveguide 140 (SiN 2) both translate (bend inward) in the x-direction (shift from right to left in FIG. 2A).

Figure 4A:
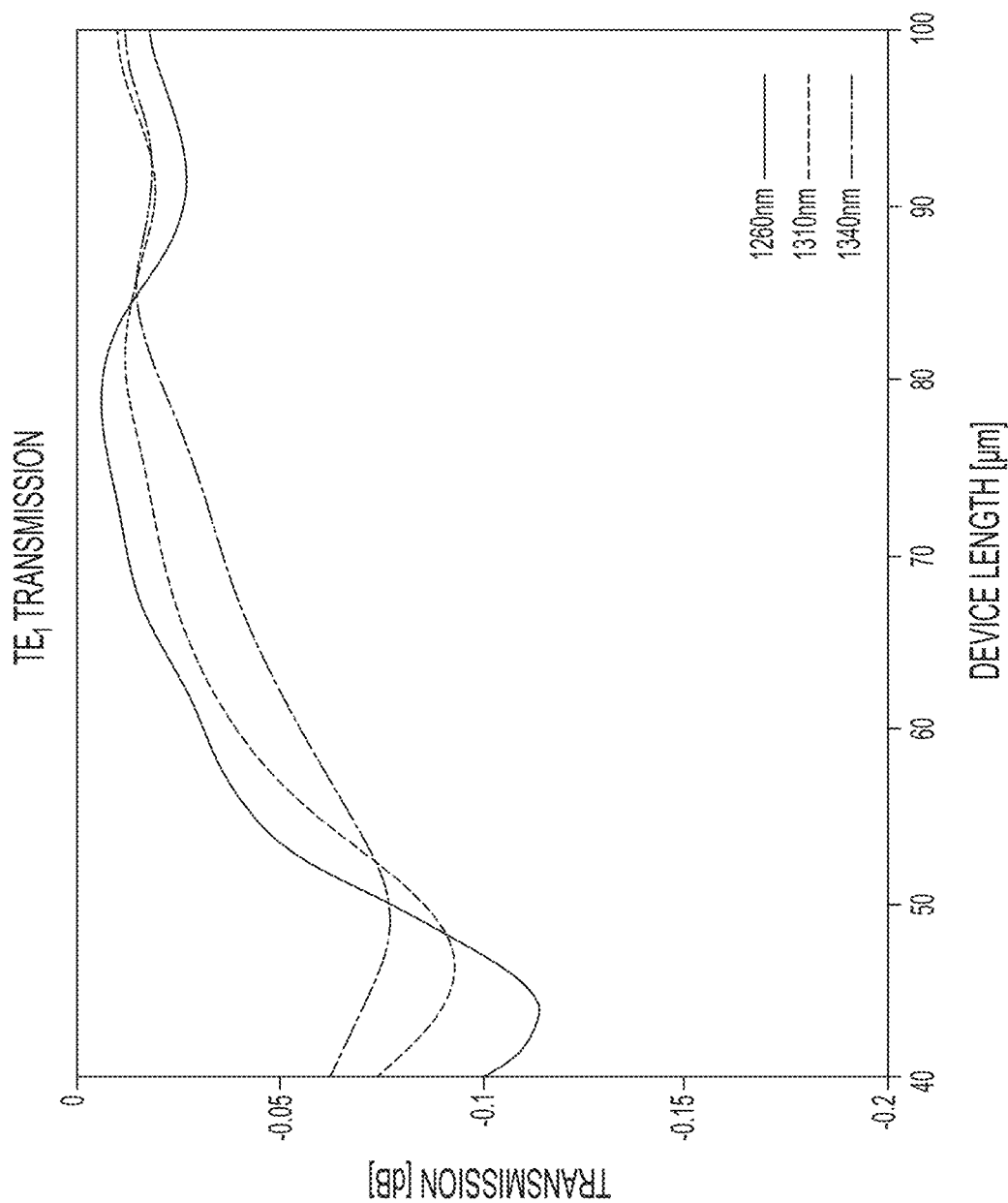
FIG. 4A is a graph showing $TE_1$ transmission of the modemux, according to an example embodiment.
Figure 4B:
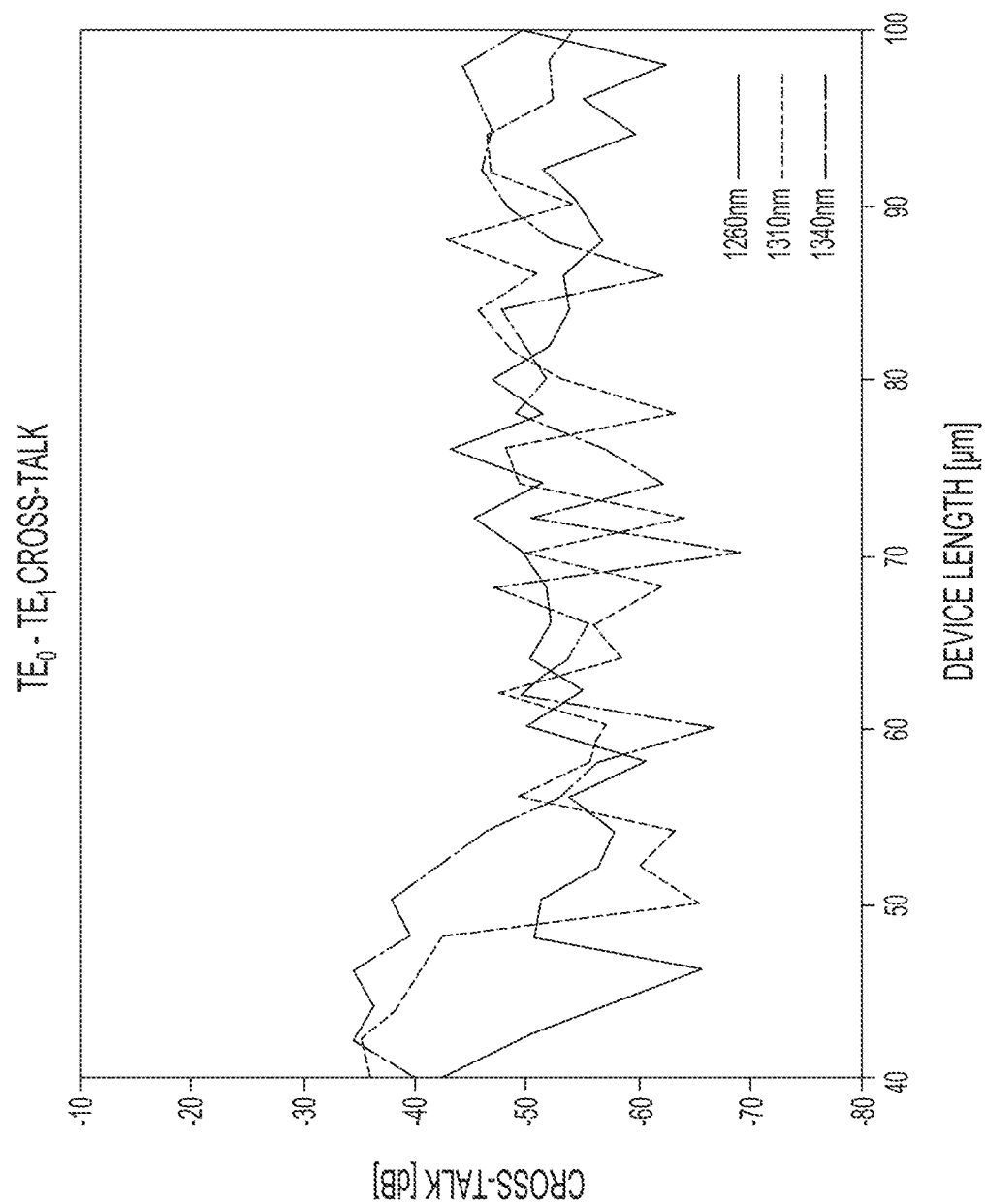
FIG. 4B is a graph showing $TE_0$-$TE_1$ cross-talk of the modemux, according to an example embodiment.

FIG. 2B shows (bend in) first region 102 at cross section B-B of FIG. 1, where the lower waveguide 130 and the upper waveguide 140 begin to overlap with the bus waveguide 120. That is, as the lower waveguide 130 (Si) and the upper waveguide 140 (SiN 2) translate (bend in) towards the longitudinal axis 115, they begin to overlap with the bus waveguide 120 in FIG. 2B. (Bend in) first region 102 has a length in the z-axis direction of about ~75 μm (refer to FIG. 1). With the disclosed dimensional configuration, there is less than −45 dB of cross-talk ($TE_0 \rightarrow TE_1$) as shown in FIG. 4B, and insertion loss (excluding propagation loss) is less than 0.03 dB as shown in FIG. 4A.

FIG. 2C shows (taper) second region 106 at cross section C-C of FIG. 1, where the lower waveguide 130 overlaps with the bus waveguide 120. In FIG. 2C, the bus waveguide 120 (SiN 1) maintains the same width of 1.6 μm in the x-axis direction, while the lower waveguide 130 (Si) and the upper waveguide 140 (SiN 2) both narrow (taper) in width in the x-axis direction (e.g., from about ~400 nm down to about ~100 nm). (Taper) second region 106 has a length in the z-axis direction of about ~25 μm (refer to FIG. 1). Theoretically, no cross-talk occurs in second region 106. Thus, the modemux 100 has an overall device length on the order of about ~100 μm and very low cross-talk according to the first example embodiment.

Ideally, the structure shown in FIGS. 2A-2C may not include a second nitride layer (e.g., upper waveguide 140 (SiN 2)). However, when a silicon layer (e.g., lower waveguide 130 (Si)) and a nitride layer (e.g., bus waveguide 120 (SiN 1)) are close to each other, translating the silicon layer (lower waveguide 130) across the nitride layer (bus waveguide 120) can result in $TE_1$-$TM_0$ mode hybridization. Without a second nitride layer (e.g., upper waveguide 140 (SiN 2)), the structure would be asymmetric in the horizontal axis (the optical axis would have a diagonal component), and would function as a bad polarization rotator (with some of the input light rotated to TM).

In accordance with an embodiment, disposing a nitride component (e.g., upper waveguide 140 (SiN 2)) in the structure shown in FIGS. 2A, 2B and 2C creates a "pseudo-symmetry" (e.g., about symmetry axis 125 shown in FIG. 2B), such that the structure is symmetric enough in the horizontal axis (with a minimal diagonal component in the optical axis) to prevent this $TE_1$-$TM_0$ mode hybridization. Thus, in the first example embodiment, the second nitride layer (e.g., upper waveguide 140 (SiN 2)) shifts together with (and follows the same path as) the silicon layer (e.g., lower waveguide 130 (Si)) to "symmetrize" the design.

Figure 3A:
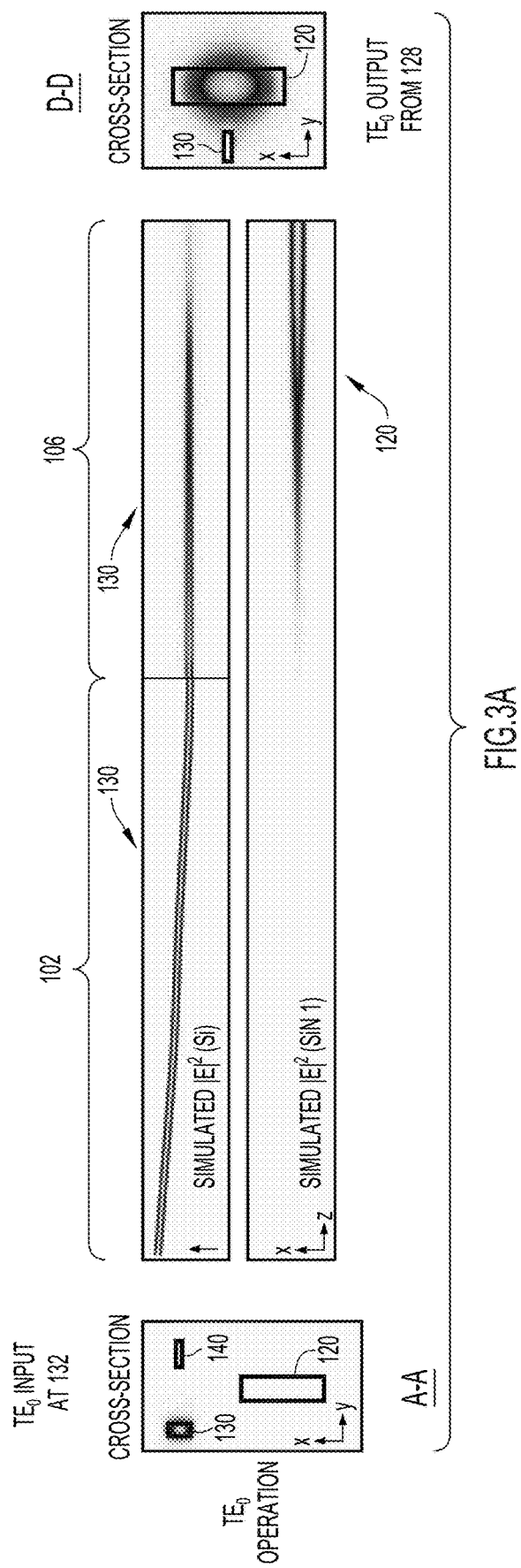
FIGS. 3A, 3B, and 3C show simulated power along a bus waveguide, a lower waveguide, and an upper waveguide of the modemux, according to an example embodiment.

FIG. 3A shows simulated optical power of a $TE_0$ mode light signal passing through the lower waveguide 130 (Si) and the bus waveguide 120 (SiN 1) of the modemux 100. The left side of FIG. 3A shows a cross-section of bus waveguide 120 at first end 122, lower waveguide 130 at untapered end 132, and upper waveguide 140 at first end 142 (i.e., at A-A in FIG. 1). The right side of FIG. 3A shows a cross-section of bus waveguide 120 at second end 128 and lower waveguide 130 at tapered end 138 (i.e., at D-D in FIG. 1).

Figure 3B:
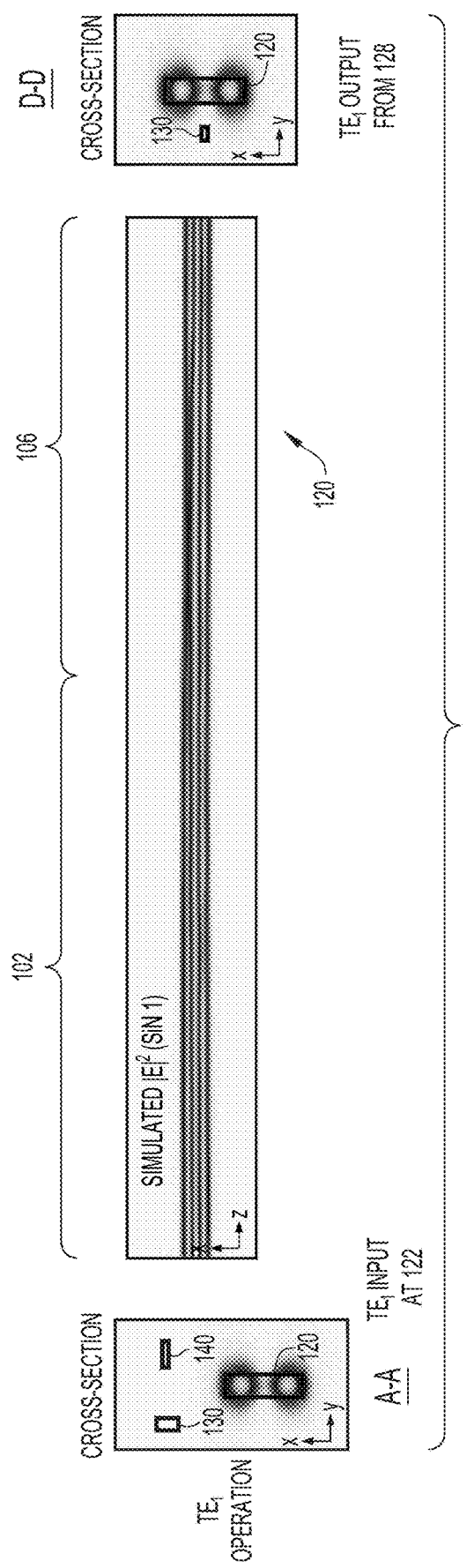

FIG. 3B shows simulated optical power of a $TE_1$ mode light signal passing through the bus waveguide 120 (SiN 1) of the modemux 100. The left side of FIG. 3B shows a cross-section of bus waveguide 120 at first end 122, lower waveguide 130 at untapered end 132, and upper waveguide 140 at first end 142 (i.e., at A-A in FIG. 1). The right side of FIG. 3B shows cross-sections of bus waveguide 120 at second end 128 and lower waveguide 130 at tapered end 138 (i.e., at D-D in FIG. 1).

Figure 3C:
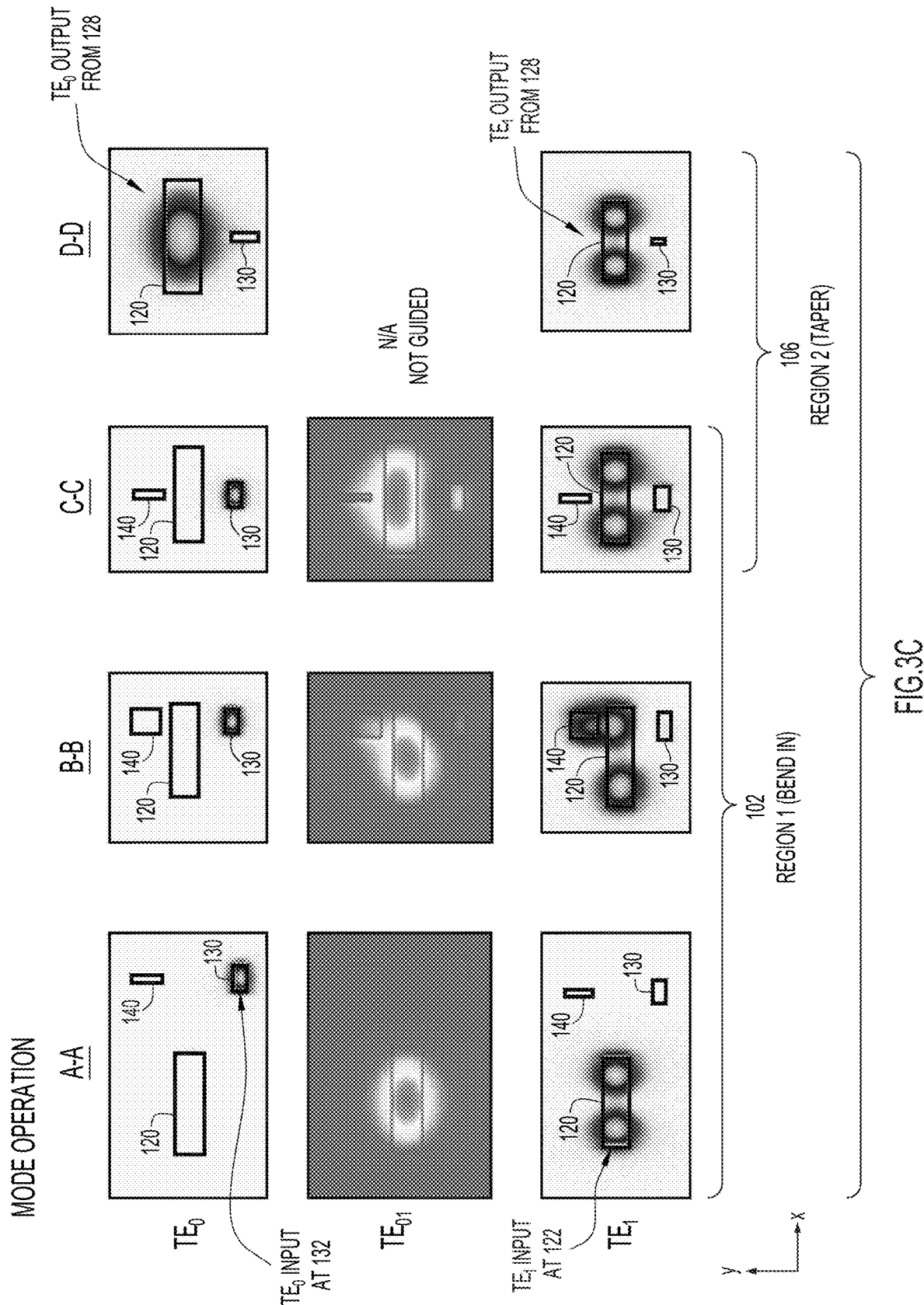

FIG. 3C shows simulated optical power of a $TE_0$ mode light signal passing through the lower waveguide 130 (Si) and the bus waveguide 120 (SiN 1), and simulated optical power of a $TE_1$ mode light signal passing through the bus waveguide 120 (SiN 1), at relative locations along the length of the modemux 100. In FIG. 3C, the lower waveguide 130 (Si) is shown below the bus waveguide 120 (SiN 1), and the upper waveguide 140 (SiN 2) is shown above the bus waveguide 120 (SiN 1). The cross-section designators A-A, B-B, C-C and D-D represent how far along the z-axis direction (refer to FIGS. 1 and 3A-3B) power measurements are detected for purposes of the simulations shown in FIG. 3C.

As can be seen from FIGS. 3A, 3B and 3C, $TE_0$ mode light introduced at the untapered end 132 of the lower waveguide 130 passes through the device and exits substantially entirely at the second end 128 of the bus waveguide 120. $TE_1$ mode light introduced at the first end 122 of the bus waveguide 120 passes through the device and exits substantially entirely at the second end 128 of the bus waveguide 120. Notably, the $TE_1$ mode light is not converted to $TE_0$ mode light as it passes through the modemux 100 described herein, unlike a standard modemux. Instead, the $TE_1$ mode light that is input into modemux 100 passes directly through the bus waveguide 120 with minimal loss. It is also noted that bus waveguide 120 guides both the $TE_1$ and $TE_0$ modes.

FIG. 4A shows simulated $TE_1$ transmission for (bend in) first region 102 of the modemux 100, and FIG. 4B shows simulated $TE_0$-$TE_1$ cross-talk for (bend in) first region 102 of the modemux 100. In a simulation for (bend in) first region 102 of modemux 100, for a device length of about ~75-80 μm, there is negligible $TE_0$ insertion loss and very low $TE_1$ insertion loss (e.g., about ~0.025 dB) as shown in FIG. 4A. There is also low $TE_0$-$TE_1$ cross-talk (e.g., less than −45 dB) as shown in FIG. 4B.

The amount or degree of shifting or translation (bend in) may be linear, or some other slowly varying continuous function, or may be adiabatically calculated, for example. In a simulation for (taper) second region 106 of modemux 100, for a device length of about ~25 μm, there is no cross-talk (theoretically), due to symmetry. The lower waveguide 130 (Si) narrows (tapers), but the bus waveguide 120 (SiN 1) does not narrow or taper. The taper shape for the lower waveguide 130 (Si) in (taper) second region 106 of modemux 100 may also be adiabatically calculated, for example.

Figure 5A:
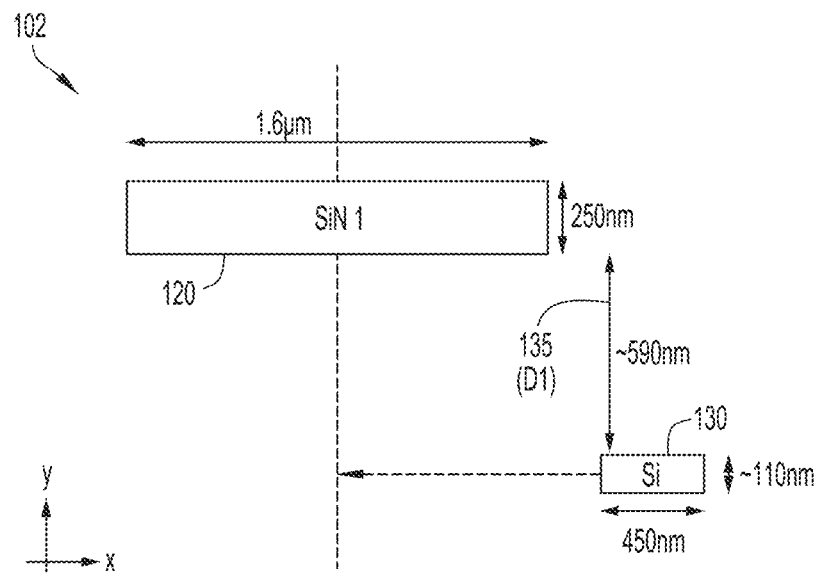
FIGS. 5A and 5B show, respectively, cross-sectional views at A-A and C-C of a variation of the modemux shown in FIG. 1, according to another example embodiment.
Figure 5B:
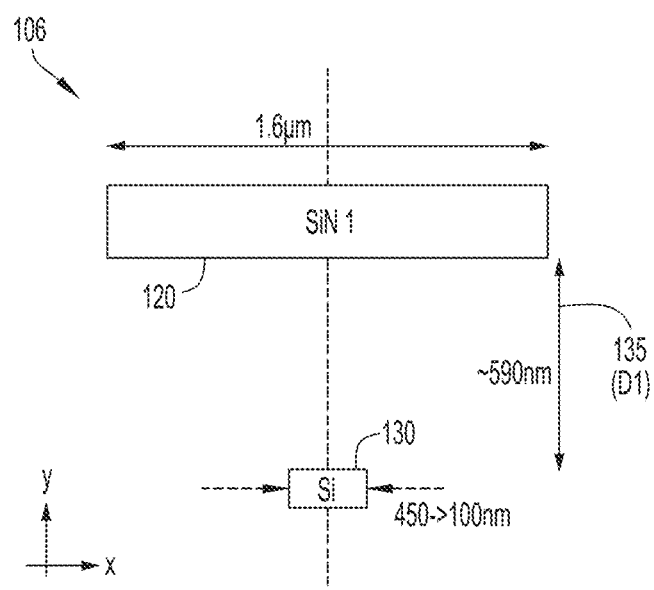

FIGS. 5A and 5B show, respectively, cross-sectional views taken at A-A and C-C of a variation of the modemux 100 shown in FIG. 1, according to another example embodiment. Instead of using a second nitride layer, such as the upper waveguide 140 (SiN 2) of FIGS. 1 and 2A-2C, FIGS. 5A-5B show a variation of a modemux that ensures the lower waveguide 130 (Si) layer and the bus waveguide 120 (SiN 1) layer are far enough away from each other to avoid the cross-talk. The large separation between these two layers reduces the $TM_0$ index, avoiding $TE_1$-$TM_0$ mode hybridization. As described above, when a silicon layer (e.g., lower waveguide 130) and a nitride layer (e.g., bus waveguide 120) are close together, translating the silicon layer across the nitride layer can result in mode hybridization (in the absence of the "pseudo-symmetry" provided by the second nitride waveguide (e.g., upper waveguide 140) in the first example embodiment above). The second example embodiment of FIGS. 5A-5B does not include the upper waveguide 140 (SiN 2), and instead utilizes a threshold distance between the bus waveguide 120 (SiN 1) and the lower waveguide 130 (Si), to avoid $TE_1$-$TM_0$ mode hybridization.

FIG. 5A shows (bend in) first region 102 at cross section A-A of FIG. 1. Bus waveguide 120 (SiN 1) has a width (in the x-axis direction) of about 1.6 μm and a thickness (in the y-axis direction) of about 250 nm. Lower waveguide 130 (Si) has a width (in the x-axis direction) of about ~450 nm and a thickness (in the y-axis direction) of about 110 nm. However, unlike the first example embodiment of FIGS. 1 and 2A-2C, there is not an upper waveguide 140 (SiN 2) in the second example embodiment of FIGS. 5A-5B. Instead, there is a gap 135 that is about 590 nm (in the y-axis direction) separating the bus waveguide 120 (SiN 1) and the lower waveguide 130 (Si). This gap 135 corresponds to a minimum threshold distance (D1) between the bus waveguide 120 (SiN 1) and the lower waveguide 130 (Si) for avoiding the $TE_1$-$TM_0$ mode hybridization described above. The lower waveguide 130 (Si) translates (bends inward towards the longitudinal axis 115) in the x-axis direction (from right to left in FIGS. 5A and 5B). In this variation, (bend in) first region 102 has a length (in the z-axis direction) of about ~70 μm, to ensure low $TE_0$→$TE_1$ cross-talk (e.g., less than −40 dB). Insertion loss is also very low.

FIG. 5B shows (taper) second region 106 at cross section C-C of FIG. 1. In FIG. 5B, the bus waveguide 120 maintains the same width of 1.6 μm in the x-axis direction, while the lower waveguide 130 (Si) narrows (tapers) in width in the x-direction (e.g., from about ~450 nm down to about ~100 nm). In this variation, (taper) second region 106 has a length (in the z-axis direction) of about ~140 μm, to have minimal loss at longer wavelengths with no cross-talk (theoretically).

In a wavelength division multiplexing (WDM) filter application, longer wavelength insertion loss is more important than shorter wavelength insertion loss, so this may be tolerable. Otherwise, a length of 180 μm (instead of 140 μm) may be useful for (taper) second region 106 according to the second example embodiment to achieve low loss across the whole O-band. It is also noted that the large gap 135 (e.g., threshold distance (D1)) between the silicon layer (e.g., lower waveguide 130 (Si)) and the nitride layer (e.g., bus waveguide 120 (SiN 1)) according to the second example embodiment makes for a long and, therefore, potentially sensitive transition (e.g., with respect to fabrication tolerances).

In some example embodiments, an adiabatic optimization algorithm can be used to calculate the profile (shape) of the silicon bend in (e.g., the lower waveguide 130 from untapered end 132 at cross-section A-A to 134 at cross-section C-C in FIG. 1). The adiabatic algorithm calculates an estimated length of ~234 μm to achieve more than 99% $TE_0$ and $TE_1$ transmission without the second nitride layer (e.g., the upper waveguide 140) according to the second example embodiment, compared to ~45 μm for the first example embodiment with the extra nitride layer (e.g., the upper waveguide 140). Thus, the addition of the upper waveguide 140 (SiN 2) in the first example embodiment of FIGS. 1 and 2A-2C results in a device that is about five times shorter in length compared to the second example embodiment of FIGS. 5A-5B. In addition, cross-talk ($TE_1$→$TE_0$) may be considered acceptable without the second nitride layer (upper waveguide 140), but may not be good enough unless (taper) second region 106 of the device is about ~140-150 μm long. Further, a device configured according to the second example embodiment of FIGS. 5A-5B may exhibit higher $TE_1$ insertion loss (scattering into $TM_0$ and $TM_1$ modes) compared to a device that is configured according to the first example embodiment of FIGS. 1 and 2A-2C.

Figure 6A:
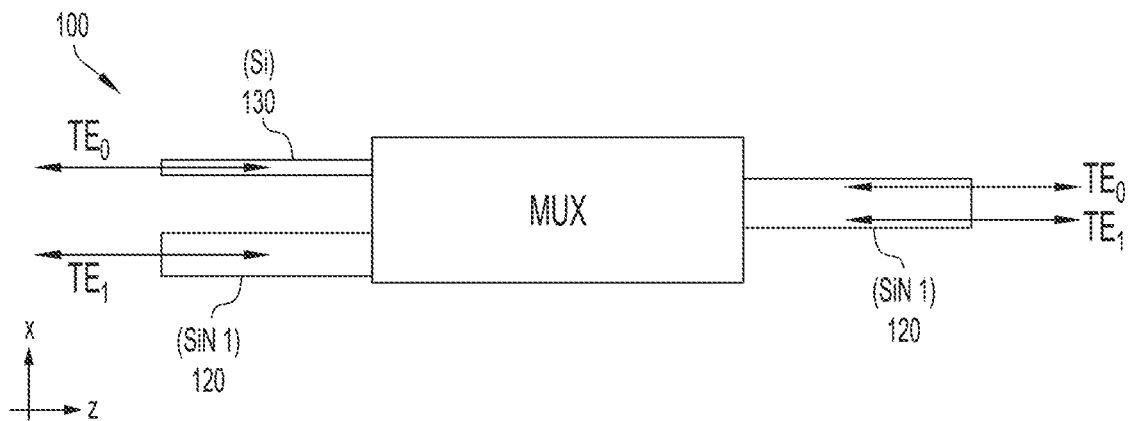
FIGS. 6A and 6B are functional block diagrams of a modemux, according to an example embodiment.
Figure 6B:
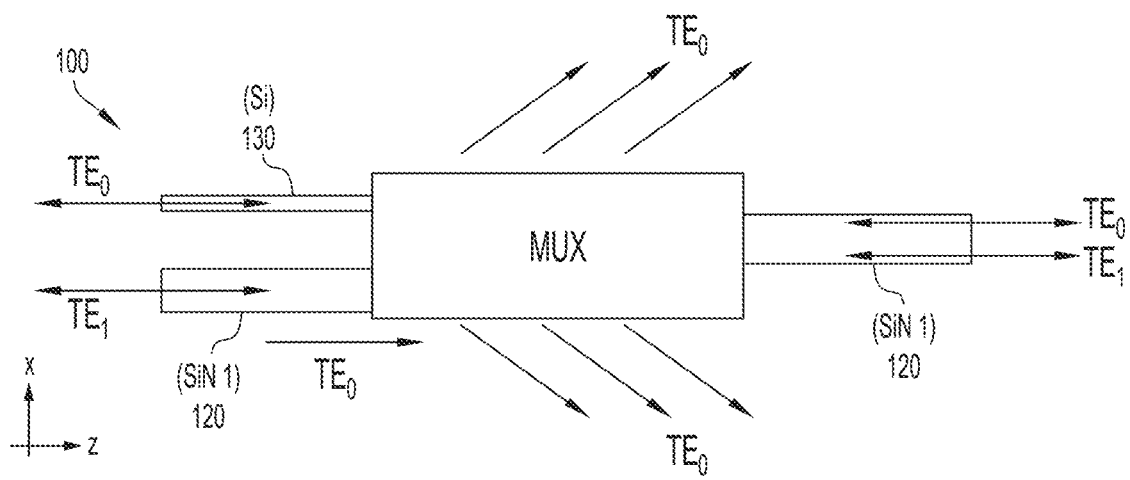

FIGS. 6A and 6B are functional block diagrams of a modemux 100, according to an example embodiment. As noted, a standard mux (not shown) converts $TE_0$ to $TE_1$. However, the modemux 100 of the present disclosure does not convert $TE_0$ to $TE_1$, as shown in FIG. 6A. Also, if $TE_0$ is launched into the nitride port (e.g., bus waveguide 120 (SiN 1)) of the modemux 100, the $TE_0$ will radiate out from modemux 100, as shown in FIG. 6B. This is not true for a standard mux in which $TE_0$ would not radiate out, but is instead converted to $TE_1$).

In some example embodiments, the bus waveguide 120 and the upper waveguide 140 may be made of dielectric materials, such as silicon nitride (SiN) or silicon oxynitride (SiON), and the lower waveguide 130 may be made of crystalline materials, such as silicon (Si), $LiNbO_3$ or InP. Bus waveguide 120, lower waveguide 130 and upper waveguide 140 may have identical or different thicknesses (in the y-axis direction).

Also, it is noted that modemux 100 can operate in either direction. From left to right in FIG. 1, modemux 100 operates as a multiplexer (one mode on each of two waveguides to two modes on one waveguide). From right to left in FIG. 1, modemux 100 operates as a demultiplexer (two modes on one waveguide to one mode of each of two waveguides). This functionality is also easily seen in FIGS. 6A and 6B.

Figure 7:
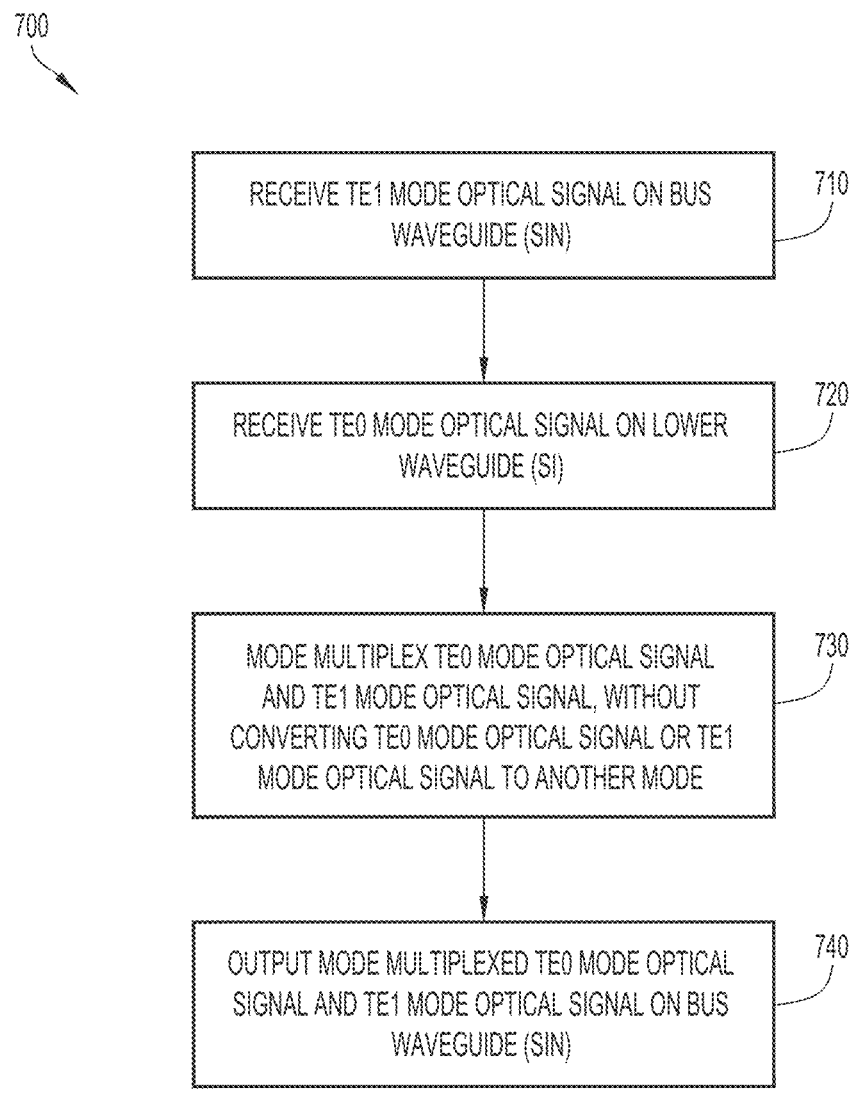
FIG. 7 is a flowchart showing a series of operations for processing light with a modemux, according to an example embodiment.

FIG. 7 is a flowchart showing a method 700 that includes a series of operations for processing light with a modemux 100, according to an example embodiment. At step 710, a photonic component (e.g., modemux 100) receives a $TE_1$ mode optical signal on a bus waveguide (SiN). At step 720, the photonic component receives a $TE_0$ mode optical signal on a lower waveguide (Si) disposed below the bus waveguide (SiN). At step 730, the photonic component mode multiplexes the $TE_1$ mode optical signal and the $TE_0$ mode optical signal, without converting the $TE_0$ mode optical signal or the $TE_1$ mode optical signal to another mode. At step 740, the photonic component outputs the mode multiplexed $TE_0$ mode optical signal and $TE_1$ mode optical signal on the bus waveguide (SiN). The structure and operation of the photonic component (e.g., modemux 100) are configured to prevent/avoid $TE_1$-$TM_0$ mode hybridization of an optical signal that traverses the bus waveguide (SiN).

In this example, the bus waveguide (SiN) is arranged linearly from a first end (e.g., input end) to a second end (e.g., output end) of the photonic component (e.g., modemux 100). The second waveguide (Si) is arranged non-linearly from the first end to the second end and includes a bend-in section that translates towards the longitudinal axis and over a first portion of the bus waveguide (SiN), and a tapered section that overlaps with a second portion of the bus waveguide (SiN). The lower waveguide (Si) does not overlap with the first portion of the bus waveguide (SiN) at the first end of the photonic component. The lower waveguide (Si) tapers along a substantially linear portion thereof that extends along the longitudinal axis. The lower waveguide (Si) narrows at the second end of the photonic component.

In one variation of this example (refer to FIGS. 5A-5B), the lower waveguide (Si) and the bus waveguide (SiN) are separated (disposed apart from each other) by at least a minimum threshold distance, which is effective to prevent/avoid (or at least limit/inhibit/reduce) $TE_1$-$TM_0$ mode hybridization of an optical signal that traverses the bus waveguide (SiN).

In another variation of this example (refer to FIGS. 1 and 2A-2C), the photonic component (e.g., modemux 100) further includes an upper waveguide (SiN 2) disposed in the bend-in region on an opposite side above the bus waveguide (SiN 1) relative to the lower waveguide (Si). The upper waveguide (SiN 2) includes a bend-in section that translates towards the longitudinal axis and over the first portion of the bus waveguide (SiN), does not overlap with the first portion of the bus waveguide (SiN 1) at the first end of the device, and substantially matches a path of the bend-in section of the lower waveguide (Si). In an embodiment, the lower waveguide and the upper waveguide are asymmetrically distanced from the bus waveguide, although these waveguides may be similarly distanced in another embodiment. The upper waveguide (SiN 2) and the lower waveguide (Si) create a pseudo-symmetry about the longitudinal axis of the bus waveguide (SiN 1) to prevent/avoid $TE_1$-$TM_0$ mode hybridization of an optical signal that traverses the bus waveguide (SiN 1). In this variation, the lower waveguide (Si) and the upper waveguide (SiN 2) may not be disposed apart from the bus waveguide (SiN 1) by some minimum threshold distance in order to effectively prevent/avoid the $TE_1$-$TM_0$ mode hybridization.

In an embodiment, the bus waveguide (SiN 1), the lower waveguide (Si) and the upper waveguide (SiN 2) are configured to mode multiplex a first $TE_0$ mode optical signal with a first $TE_1$ mode optical signal, without converting the first $TE_0$ mode optical signal into a second TE mode optical signal. Additionally, or alternatively, the bus waveguide (SiN 1), the lower waveguide (Si) and the upper waveguide (SiN 2) are configured to mode multiplex the first $TE_0$ mode optical signal with the first $TE_1$ mode optical signal, without converting the first $TE_1$ mode optical signal into a second $TE_0$ mode optical signal.

Example Use Case Device (Bragg-Based Demultiplexer)

Example applications for the design of the modemux 100 of this disclosure, which may be implemented according to either the first example embodiment of FIGS. 1 and 2A-2C or the second example embodiment of FIGS. 5A-5B, are described below with reference to FIGS. 8-12.

$TE_{HO}$ represents a "higher order TE-mode" ($TE_A$ where A integer and A>0), where a "TE-mode" is defined as a mode that is substantially TE-polarized. This notation is used to indicate the architecture is compatible with all higher-order modes, not just $TE_1$, which is typically used in many instances. The example embodiments described herein and illustrated in the drawings generally use $TE_{HO}$=$TE_1$. However, this is not a requirement and does not imply any loss of generality to the architecture described herein for other higher order TE-modes.

An example architecture for a Bragg-based WDM may use some form of modemux and a Bragg grating. The Bragg converts $TE_0$ to $TE_{HO}$ (e.g., $TE_1$), and the modemux multiplexes inputs from two single-mode ($TE_0$) waveguides onto two modes ($TE_0$ and $TE_{HO}$) of one multimode output waveguide. $TE_0$ from input A is passed through to $TE_0$ on the output, and $TE_0$ from input B is converted to $TE_{HO}$ on the output ($TE_{0,A}$<→$TE_{0,B}$ and $TE_{0,B}$<→$TE_{HO}$). An existing architecture may rely on a modemux that performs the $TE_{0,A}$<→$TE_0$ and the $TE_{0,B}$<→$TE_{HO}$ in a single component, in which multiplexing and mode conversion are done as a single step.

A first typical Bragg-based demultiplexing architecture consists of a Bragg grating that converts $TE_0$<→$TE_1$ excited through a directional coupler style multiplexer. The directional coupler style multiplexer (or "coupler mux") couples $TE_0$ from one port to $TE_1$ on output (conversion), and passes $TE_0$ from the other port as $TE_0$ on output (pass). The multiplexing principle behind this typical architecture is that the multiplexing directional coupler relies on phase-matching the $TE_0$ mode of a single waveguide to the $TE_1$ of a multimode waveguide. However, this style of coupler mux is essentially unusable for integrated WDM receiver requirements because phase matching of $TE_0$ of a single-mode waveguide to $TE_1$ of a multimode waveguide will generally occur precisely at one wavelength, resulting in an unacceptable bandwidth, and there will still be phase matching from $TE_0$ in the single-mode waveguide to $TE_0$ in the multimode waveguide, causing large cross-talk.

A second typical Bragg-based demultiplexing architecture consists of a Bragg grating that converts $TE_0$<→$TE_1$ excited through an adiabatic modemux. The "modemux" couples $TE_0$ from one port to $TE_1$ on output (conversion), and passes $TE_0$ from the other port as $TE_0$ on output (pass). The multiplexing principle behind this typical architecture is that the modemux relies on a single component to convert $TE_0$ to $TE_1$ of a multimode waveguide, while transmitting $TE_0$ to that multimode waveguide. On one side of the modemux, there are two single mode waveguides, which give rise to a pair of "degenerate" (or very similar) waveguide $TE_0$-like modes. These modes are phase matched, and can easily couple unless well isolated. To perform the modemuxing operation, converting one of these two modes to $TE_1$ is to be performed, in some manner without causing cross-talk. In other words, a device may be designed to perturb a first input $TE_0$ mode signal into an output $TE_1$ mode signal, without causing any scattering into an output $TE_0$ mode signal. However, this is a difficult task when the first input $TE_0$ mode signal and a second input $TE_0$ mode signal are phase matched towards one side of the modemux. Furthermore, because this is all done in SiN, the index contrast between the output $TE_0$ mode signal and the output $TE_1$ mode signal cannot be that high. This architecture requires at least a 200 um long modemux (likely 300-400 um), and is reliant on stable nitride thickness, etc. Most of the "length" in this modemux is due to the output bends of the modemux. It is very difficult to get low cross-talk as the waveguide becomes degenerate.

Thus, some typical architectures may use a regular modemux (e.g., a standard, traditional, or conventional modemux), in which $TE_0$ is multiplexed into a multimode waveguide at the same time that $TE_0$ is converted into $TE_1$ of the multimode waveguide. However, because both operations occur at once, cross-talk is compromised. In some typical schemes, the whole block (i.e., standard modemux and Bragg) ideally has very low cross-talk ('$TE_0$'→$TE_1$ and '$TE_1$'→$TE_0$ cross talks are ideally both extremely low). Therefore, the typical Bragg-based demultiplexing architectures described above struggle to deliver low return loss due to difficulty implementing a compact, robust, low cross-talk modemux.

Figure 8:
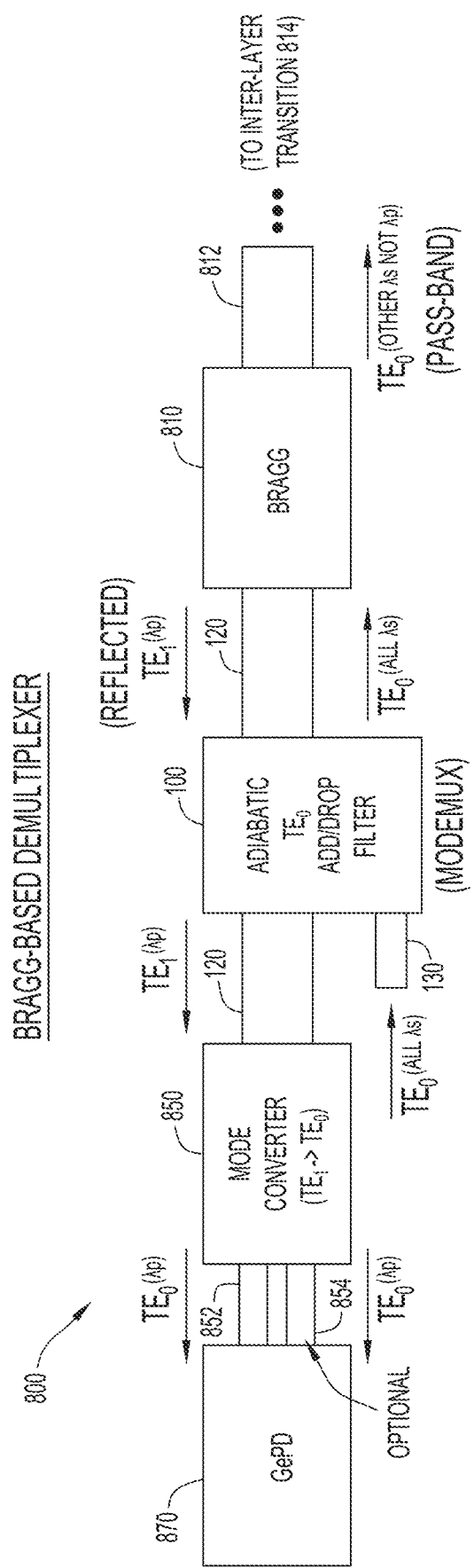
FIG. 8 is a block diagram of a use case device including a $TE_0$ mode add/drop filter (modemux), a (backward-reflecting) Bragg grating, and a $TE_1 \rightarrow TE_0$ mode converter to provide a Bragg-based demultiplexer, according to an example embodiment.

Accordingly, the present disclosure provides a wavelength division multiplexing (WDM) architecture based on an integrated Bragg (e.g., Bragg grating 810) and adiabatic mode add/drop filter (e.g., modemux 100), also referred to herein as a Bragg-based demultiplexer 800 as described below with reference to FIG. 8. As shown in FIG. 8, a Bragg-based demultiplexer 800 utilizes a novel multiplexing (or "modemuxing") functionality through a combination of two distinct components that: (1) adiabatically transmit $TE_0$ from A to $TE_0$ on a multimode waveguide, while also transmitting a B input that is $TE_{HO}$ to $TE_{HO}$ on the same multimode waveguide (via the "adiabatic $TE_0$ mode add/drop filter" 100 functionality), and (2) separately convert a $TE_0$-like input to the input B $TE_{HO}$ mode (via the "TE1→TE0 mode converter" 850 functionality).

FIG. 8 is a block diagram of a use case device for an adiabatic $TE_0$ mode add/drop filter (modemux) 100 to provide a Bragg-based demultiplexer (also referred to as an integrated Bragg-based WDM architecture), according to an example embodiment. In particular, as shown in FIG. 8, the Bragg-based demultiplexer 800 (or simply, apparatus 800)

includes a (backward-reflecting) Bragg grating 810, and is further implemented using a multimode waveguide with an adiabatic $TE_0$ mode add/drop filter 100 (modemux 100 as described above), along with a $TE_1 \rightarrow TE_0$ mode converter 850 component as further described below. The $TE_0$ add/drop filter (modemux) 100 has a unique design, in that it does not convert a $TE_0$ mode optical signal to a $TE_1$ mode optical signal and/or does not convert a $TE_1$ mode optical signal to a $TE_0$ mode optical signal when performing a multiplexing (or modemuxing) operation. The mode converter 850 may be connected to a photodetector 870 (GePD) via one or more waveguides 852, 854 (waveguide 854 may be optional in some example embodiments). The mode converter 850 is a component that is configured to convert $TE_1$ in a multi-mode SiN waveguide into an optical signal (e.g., $TE_0$ mode light or ~99% $TE_0$-like mode light) that can be detected by the photodetector 870 (GePD), for example.

More specifically, referring to FIG. 8, the $TE_0$ add/drop filter 100 includes a lower waveguide 130 (e.g., a single-mode Si waveguide) that is configured to receive a $TE_0$ mode optical signal having two or more wavelengths (e.g., $\lambda_1, \lambda_2, \ldots, \lambda_N$), and a bus waveguide 120 (e.g., a multimode SiN waveguide) that is connected with the Bragg 810 and is configured to (modemux and) transmit the $TE_0$ mode optical signal (all wavelengths $\lambda_1$-$\lambda_N$) to the Bragg 810, without converting the $TE_0$ mode optical signal to another mode (e.g., $TE_1$).

The Bragg 810 is configured to receive the $TE_0$ mode optical signal (all as) from the $TE_0$ add/drop filter 100 on the multimode (SiN) bus waveguide 120, and reflect a first portion of the $TE_0$ mode optical signal having a particular wavelength (e.g., $\lambda_P$, which is one of $\lambda_1, \lambda_2, \ldots, \lambda_N$) back to the $TE_0$ add/drop filter 100 on the bus waveguide 120. The operation of reflecting the first portion of the $TE_0$ mode optical signal ($\lambda_P$) converts this optical signal to a (drop-band) $TE_1$ mode optical signal having that particular wavelength ($\lambda_P$). The $TE_0$ add/drop filter 100 is further configured to receive the reflected (drop-band) $TE_1$ mode optical signal at the particular wavelength ($\lambda_P$) from the Bragg 810 on the bus waveguide 120, and (modemux and) transmit the reflected (drop-band) $TE_1$ mode optical signal ($\lambda_P$) on the bus waveguide 120 towards a photodetector (GePD) 870 (i.e., via the mode converter 850), without converting the reflected (drop-band) $TE_1$ mode optical signal ($\lambda_P$) to another mode (e.g., $TE_0$).

The $TE_1 \rightarrow TE_0$ mode converter 850 is configured to receive the (drop-band) $TE_1$ mode optical signal at the particular wavelength ($\lambda_P$) from the $TE_0$ add/drop filter 100 on the bus waveguide 120, and convert the (drop-band) $TE_1$ mode optical signal having the particular wavelength ($\lambda_P$) to a (drop-band) $TE_0$ mode optical signal having the particular wavelength ($\lambda_P$). The mode converter 850 is connected with the photodetector (GePD) 870 via a waveguide 852 (e.g., a single-mode Si waveguide), and is further configured to transmit the converted (drop-band) $TE_0$ mode optical signal at the particular wavelength ($\lambda_P$) to the photodetector (GePD) 870 on the single-mode (Si) waveguide 852. The photodetector (GePD) 870 is configured to receive and detect the converted (drop-band) $TE_0$ mode optical signal at the particular wavelength ($\lambda_P$) that is received from the mode converter 850.

In some example embodiments, the Bragg 810 may be further connected with an inter-layer transition 814 via a waveguide 812 (e.g., a multimode SiN waveguide), and is configured to transmit a (pass-band) $TE_0$ mode optical signal to the inter-layer transition 814 on the multimode (SiN) waveguide 812, where the (pass-band) $TE_0$ mode optical signal corresponds to a second portion of the $TE_0$ mode optical signal having one or more wavelengths (e.g., $\lambda_1, \lambda_2, \ldots, \lambda_N$) other than the particular wavelength ($\lambda_P$) that is not reflected by (and passes through) the Bragg 810.

Thus, multiple Bragg-based demultiplexers may be cascaded together in stages, as further described below with reference to FIG. 10, in order to reflect and detect a (drop-band) optical signal having a respective wavelength in a given stage, while allowing a (pass-band) optical signal having other wavelengths to pass through to the next stage for further processing. Instead of performing multiplexing (modemuxing) and mode conversion ($TE_1 \rightarrow TE_0$ or $TE_0 \rightarrow TE_1$) in a single device/operation (which may result in undesirable cross-talk as described above), the apparatus 800 has a device structure that separately performs multiplexing/modemuxing and mode conversion in two distinct devices/operations in a manner that minimizes or reduces cross-talk.

The modemux 100 shown in FIG. 8 avoids any potential degeneracies between waveguides, in contrast to the second typical architecture (standard modemux) described above. $n_{eff}$ of $TE_0$ never matches (or nearly matches) $n_{eff}$ of $TE_1$. Also, the modemux 100 shown in FIG. 8 is, in one embodiment, operated entirely in the adiabatic regime, remaining broadband, in contrast to the first typical architecture (coupler mux) described above. The modemux 100 of FIG. 8 may use multiple waveguiding materials (SiN and Si) to ensure that there is minimal phase matching between $TE_0$ and $TE_1$, so cross-talk is extremely low.

Unlike the typical architectures described above, the proposed architecture (e.g., apparatus 800) described herein uses two different adiabatic components having a configuration that separately muxes $TE_0$ and $TE_1$ in one component (adiabatic $TE_0$ mode add/drop filter 100), and converts $TE_1$ to $TE_0$-like mode(s) in another component ($TE_1$-$TE_0$ mode converter 850, as shown in FIG. 8). Thus, the device of FIG. 8 converts $TE_0 \leftrightarrow TE_1$ independently of muxing onto the multimode waveguide. Notably, $TE_0$ is muxed onto the multimode waveguide once $TE_1$ is fully present. In this device, cross-talk is irrelevant at the $TE_1 \rightarrow TE_0$ mode converter 850 block of FIG. 8, where there is an arbitrary number of ports on the output side shown on the left (depending on implementation/requirements). In the present embodiments, the adiabatic $TE_0$ mode add/drop filter 100 block (modemux component) of FIG. 8 is designed to have very low cross-talk (for $TE_0 \rightarrow TE_1$ and $T_1 \rightarrow TE_0$ conversion), which can be achieved using different materials to create a large phase mismatch according to one example embodiment, and/or to create symmetry according to another example embodiment, as described above with reference to FIGS. 1-7, for example. One advantage of the proposed architecture (apparatus 800) described herein is that, by utilizing the modemux 100 described above, the apparatus 800 (Bragg-based demultiplexer) can be made very low cross-talk (meeting the return loss specification), is low insertion loss, and is compact.

According to an aspect of the present disclosure, an inter-layer transition may be used to convert from the modemux 100/Bragg 810 layer (on a multimode SiN waveguide) to the photodetector (GePD) 870 layer (on a single-mode Si waveguide). The typical architectures described above (e.g., using a standard modemux) make use of a transition block with one input (e.g., SiN or Si) and one output (e.g., Si or SiN). However, in the proposed architecture (apparatus 800 of FIG. 8), a $TE_1 \rightarrow TE_0$ mode converter 850 is utilized in addition to the $TE_0$ add/drop filter (modemux) 100, as shown in FIG. 8.

Figure 9A:
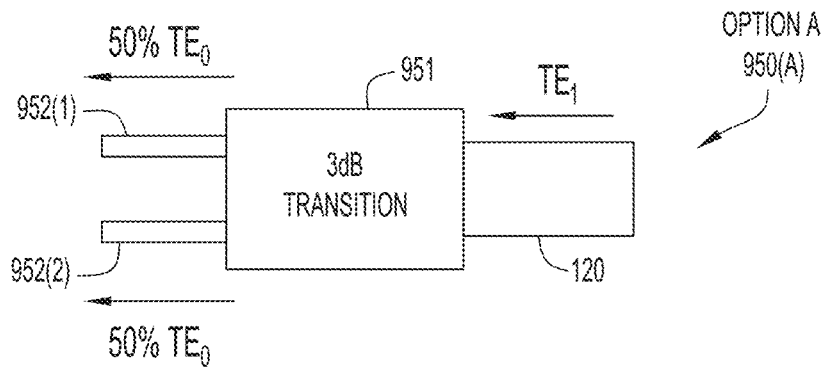
FIGS. 9A, 9B, and 9C are block diagrams of different implementations for the $TE_1 \rightarrow TE_0$ mode converter of FIG. 8, according to an example embodiment.
Figure 9B:
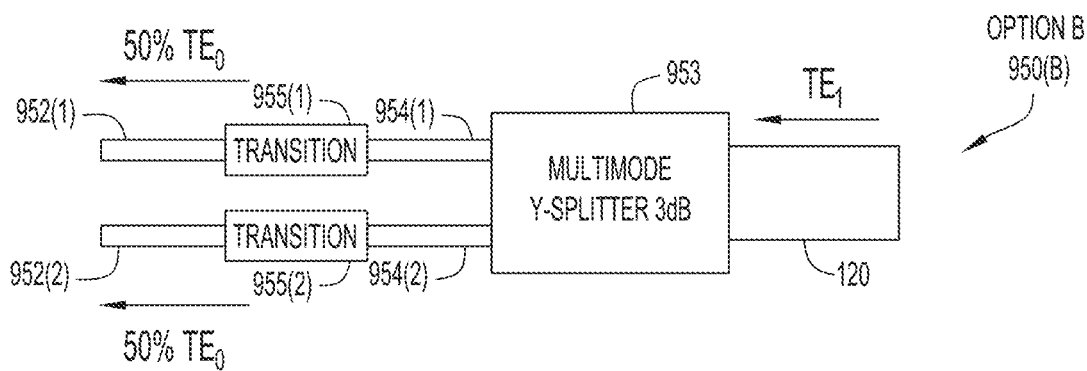
Figure 9C:
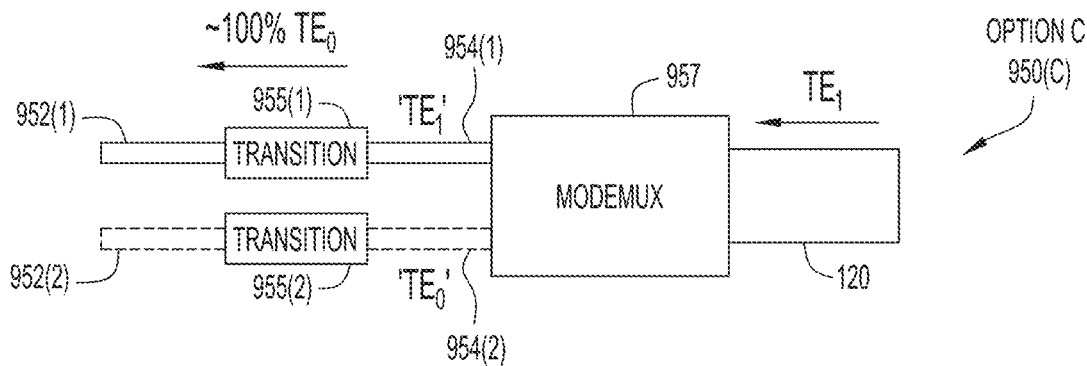

Next, three example implementations (options A, B, and C) for the "$TE_1 \rightarrow TE_0$ mode converter" 850 of FIG. 8, which converts $TE_1$ in multimode SiN waveguide into $TE_0$, are described in further detail below with reference to FIGS. 9A, 9B, and 9C, respectively. FIG. 9A shows a mode converter 950(A) (option A) including a "3 dB transition" 951, which provides an adiabatic splitter/transition (SiN/Si) all in one, and is compact (e.g., ~50 um). The mode converter 950(A) may also be referred to as a "bilayer photonic 3 dB y-splitter," for example. FIG. 9B shows a mode converter 950(B) (option B) including a straight-forward "3 dB multimode y-splitter" 953 (SiN), with standard interlayer (SiN→Si) transitions 955(1), 955(2). FIG. 9C shows a mode converter 950(C) (option C) including a standard modemux 957 (SiN) with standard interlayer (SiN→Si) transitions 955(1), 955 (2), but without a stringent cross-talk requirement. Hence, it will be very compact. As indicated with dashed lines in FIG. 9C, the "$TE_0$" port is optionally routed to the photodetector (GePD) 870 of FIG. 8, which may slightly boost power to the photodetector 870 if cross-talk is particularly bad. Otherwise, the mode converter 950(C) may have one output (the "$TE_1$" port) in this example.

As described above, the integrated Bragg-based WDM architecture of FIG. 8 utilizes the novel multiplexing (or modemuxing) functionality embodied by adiabatic $TE_0$ mode add/drop filter (modemux) 100, in which the modemux 100 does not attempt to convert an input $TE_0$ mode optical signal of an individual (or "single-mode") waveguide into an output $TE_1$ mode optical signal (or vice versa) as described above, in contrast to some typical architectures (e.g., using a standard modemux). Instead, the adiabatic $TE_0$ mode add/drop filter (modemux) 100 shown in FIG. 8 has both a multimode input (bus waveguide 120) and a single-mode input (lower waveguide 130), for transmitting a $TE_1$ mode optical signal as a $TE_1$ mode optical signal, while adiabatically transferring the $TE_0$ mode optical signal (or vice versa). As used herein, the phrase "without converting" or "does not convert" may comprise not only full/complete (100%) avoidance of mode conversion, but also something that substantially/significantly/nearly completely (e.g., 90%, 95%, 98%, 99.9%, etc.) avoids mode conversion. The modemux 100 described herein can be used for an integrated Bragg-based WDM architecture on a receiver, for example, as described below with reference to FIG. 10.

Figure 10:
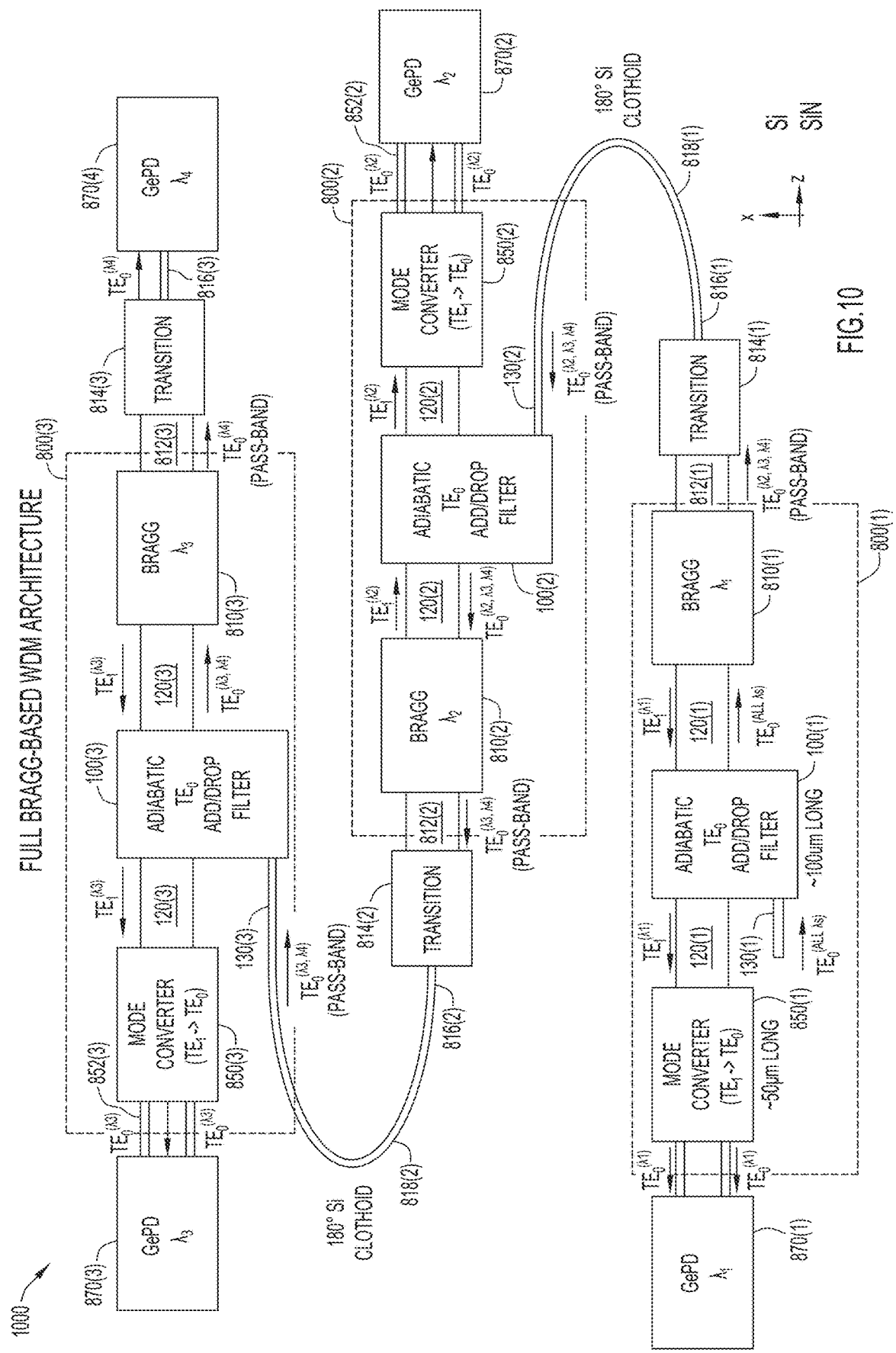
FIG. 10 is a block diagram of a full Bragg-based WDM architecture including three Braggs/Bragg-based demultiplexers of FIG. 8 for separating different wavelengths, respectively, according to an example embodiment.

FIG. 10 shows a proposed integrated Bragg-based WDM architecture using the example implementations described above. FIG. 10 is a block diagram of a full Bragg-based WDM architecture 1000 that provides a three-stage demultiplexing architecture for separating out four wavelengths, according to an example embodiment. The full Bragg-based WDM architecture 1000 (or simply, apparatus 1000) includes a first Bragg-based demultiplexer 800(1), a second Bragg-based demultiplexer 800(2), and a third Bragg-based demultiplexer 800(3) each having an identical or substantially similar configuration as apparatus 800 of FIG. 8 and designed for a respective wavelength.

More specifically, referring to FIG. 10, the first apparatus 800(1) includes a first adiabatic $TE_0$ mode add/drop filter (modemux) 100(1), a first Bragg 810(1), and a first $TE_1 \rightarrow TE_0$ mode converter 850(1). The first $TE_0$ add/drop filter 100(1) includes a first lower waveguide 130(1) (e.g., a single-mode Si waveguide) that is configured to receive a $TE_0$ mode optical signal having two or more wavelengths (e.g., four wavelengths in the example of FIG. 10, which are collectively denoted as "all $\lambda$s"), and a first bus waveguide 120(1) (e.g., a multimode SiN waveguide) that is connected with the first Bragg 810(1) and is configured to (modemux and) transmit the $TE_0$ mode optical signal (all $\lambda$s) to the first Bragg 810(1) without converting the $TE_0$ mode optical signal to another mode (e.g., $TE_1$).

The first Bragg 810(1) is configured to receive the $TE_0$ mode optical signal (all $\lambda$s) from the first $TE_0$ add/drop filter 100(1) on the first bus waveguide 120(1), and reflect a first portion of the $TE_0$ mode optical signal having a first wavelength ($\lambda_1$) back to the first $TE_0$ add/drop filter 100(1) on the first bus waveguide 120(1). The operation of reflecting the first portion of the $TE_0$ mode optical signal ($\lambda_1$) converts this optical signal to a first (drop-band) $TE_1$ mode optical signal having the first wavelength ($\lambda_1$). The first $TE_0$ add/drop filter 100(1) is further configured to receive the reflected first (drop-band) $TE_1$ mode optical signal at the first wavelength ($\lambda_1$) from the first Bragg 810(1) on the first bus waveguide 120(1), and (modemux and) transmit the reflected first (drop-band) $TE_1$ mode optical signal ($\lambda_1$) on the first bus waveguide 120(1) towards a first photodetector (GePD) 870(1) (i.e., via the first mode converter 850(1)), without converting the reflected first (drop-band) $TE_1$ mode optical signal ($\lambda_1$) to another mode (e.g., $TE_0$).

The first $TE_1 \rightarrow TE_0$ mode converter 850(1) is configured to receive the first (drop-band) $TE_1$ mode optical signal at the first wavelength ($\lambda_1$) from the first $TE_0$ add/drop filter 100(1) on the first bus waveguide 120(1), and convert the first (drop-band) $TE_1$ mode optical signal having the first wavelength ($\lambda_1$) to a first (drop-band) $TE_0$ mode optical signal having the first wavelength ($\lambda_1$). The first mode converter 850(1) is connected with the first photodetector (GePD) 870(1) via a waveguide 852(1) (e.g., a single-mode Si waveguide), and is further configured to transmit the converted first (drop-band) $TE_0$ mode optical signal ($\lambda_1$) to the first photodetector (GePD) 870(1) on the waveguide 852(1). The first photodetector (GePD) 870(1) is configured to receive and detect the converted first (drop-band) $TE_0$ mode optical signal at the first wavelength ($\lambda_1$) that is received from the first mode converter 850(1).

In the example embodiment of FIG. 10, the first Bragg 810(1) is further connected with a first inter-layer transition 814(1) via a waveguide 812(1) (e.g., a multimode SiN waveguide), and is configured to transmit a first (pass-band) $TE_0$ mode optical signal to the first transition 814(1) on the waveguide 812(1), where the first (pass-band) $TE_0$ mode optical signal corresponds to a second portion of the $TE_0$ mode optical signal having one or more wavelengths (e.g., three wavelengths denoted as $\lambda_2$, $\lambda_3$, $\lambda_4$) other than the first wavelength ($\lambda_1$) that is not reflected by (and passes through) the first Bragg 810(1).

The first transition 814(1) is configured to receive the first (pass-band) $TE_0$ mode optical signal having the other wavelengths ($\lambda_2$, $\lambda_3$, $\lambda_4$) on the waveguide 812(1), and transmit the first (pass-band) $TE_0$ mode optical signal ($\lambda_2$, $\lambda_3$, $\lambda_4$) towards a second adiabatic $TE_0$ mode add/drop filter 100(2) of the second apparatus 800(2). The first transition 814(1) is connected to the second $TE_0$ add/drop filter 100(2) via one or more waveguides (e.g., waveguide 816(1) and waveguide 818(1)) connected with a second lower waveguide 130(2) (e.g., a single-mode Si waveguide) of the second $TE_0$ add/drop filter 100(2). The waveguide 816(1) and the waveguide 818(2) may be single-mode (Si) waveguides, for example, where the waveguide 818(2) forms a bend or curve (denoted as "180 degree Si clothoid" 818(1) in FIG. 10). Thus, in this manner the first apparatus 800(1) and the second apparatus 800(2) are cascaded together in stages in order to reflect and detect a (drop-band) optical signal having a first wavelength ($\lambda_1$) in the first stage, while allowing a (pass-band) optical signal having other wavelengths ($\lambda_2$, $\lambda_3$, $\lambda_4$) to pass through (to the second stage) for further processing, and effectively limiting cross-talk.

Likewise, the second apparatus 800(2) includes the second adiabatic $TE_0$ mode add/drop filter (modemux) 100(2), a second Bragg 810(2), and a second $TE_1 \rightarrow TE_0$ mode converter 850(2). The second $TE_0$ add/drop filter 100(2) includes the second lower waveguide 130(2) (e.g., a single-mode Si waveguide) that is configured to receive the first (pass-band) $TE_0$ mode optical signal having the other wavelengths (e.g., $\lambda_2$, $\lambda_3$, $\lambda_4$) other than the first wavelength ($\lambda_1$) from the first Bragg 810(1) via the first transition 814(1) and the waveguides 816(1), 818(1). The second $TE_0$ add/drop filter 100(2) also includes a second bus waveguide 120(2) (e.g., a multimode SiN waveguide) that is connected with the second Bragg 810(2) and is configured to (modemux and) transmit the first (pass-band) $TE_0$ mode optical signal at the other wavelengths ($\lambda_2$, $\lambda_3$, $\lambda_4$) to the second Bragg 810(2), without converting the first (pass-band) $TE_0$ mode optical signal ($\lambda_2$, $\lambda_3$, $\lambda_4$) to another mode (e.g., $TE_1$). The second Bragg 810(2) receives the first (pass-band) $TE_0$ mode optical signal ($\lambda_2$, $\lambda_3$, $\lambda_4$) from the second $TE_0$ add/drop filter 100(2) on the second bus waveguide 120(2), and reflects a first portion of the first (pass-band) $TE_0$ mode optical signal having a second wavelength ($\lambda_2$) back to the second $TE_0$ add/drop filter 100(2) on the second bus waveguide 120(2), while also converting this optical signal to a second (drop-band) $TE_1$ mode optical signal having the second wavelength ($\lambda_2$). The second $TE_0$ add/drop filter 100(2) receives the reflected second (drop-band) $TE_1$ mode optical signal having the second wavelength ($\lambda_2$) from the second Bragg 810(2) on the second bus waveguide 120(2), and transmits the reflected second (drop-band) $TE_1$ mode optical signal ($\lambda_2$) on the second bus waveguide 120(2) towards a second photodetector (GePD) 870(2) (i.e., via the second mode converter 850(2)), without converting the second (drop-band) $TE_1$ mode optical signal ($\lambda_2$) to another mode (e.g., $TE_0$).

The second $TE_1 \rightarrow TE_0$ mode converter 850(2) receives the second (drop-band) $TE_1$ mode optical signal at the second wavelength (0.2) from the second $TE_0$ add/drop filter 100(2) on the second bus waveguide 120(2), converts the second (drop-band) $TE_1$ mode optical signal having the second wavelength ($\lambda_2$) to a second (drop-band) $TE_0$ mode optical signal having the second wavelength ($\lambda_2$), and transmits the converted second (drop-band) $TE_0$ mode optical signal ($\lambda_2$) to the second photodetector (GePD) 870(2) on the waveguide 852(2), where the second photodetector (GePD) 870(2) receive and detects the converted second (drop-band) $TE_0$ mode optical signal at the second wavelength ($\lambda_2$) that is received from the second mode converter 850(2). The second Bragg 810(2) is connected with a second inter-layer transition 814(2) via a waveguide 812(2) (e.g., a multimode SiN waveguide), and transmits a second (pass-band) $TE_0$ mode optical signal to the second transition 814(2) on the waveguide 812(2), where the second (pass-band) $TE_0$ mode optical signal corresponds to a second portion of the first (pass-band) $TE_0$ mode optical signal having other wavelengths (e.g., $\lambda_3$, $\lambda_4$) other than the second wavelength ($\lambda_2$) that is not reflected by (and passes through) the second Bragg 810(2). The second transition 814(2) receives the second (pass-band) $TE_0$ mode optical signal at the other wavelengths ($\lambda_3$, $\lambda_4$) on the waveguide 812(2), and transmits the second (pass-band) $TE_0$ mode optical signal ($\lambda_3$, $\lambda_4$) towards a third adiabatic $TE_0$ mode add/drop filter 100(3) via one or more waveguides (e.g., a single-mode Si waveguide 816(2), and a bent/curved (180 degree single-mode Si clothoid) waveguide 818(2)) connected with a third lower waveguide 130(3) (e.g., a single-mode Si waveguide) of the third $TE_0$ add/drop filter 100(3). Thus, the second apparatus 800(2) and the third apparatus 800(3) are cascaded together in stages in order to reflect and detect a (drop-band) optical signal having a second wavelength ($\lambda_2$) in the second stage, while allowing a (pass-band) optical signal having other wavelengths ($\lambda_3$, $\lambda_4$) to pass through (to the third stage) for further processing, and effectively limiting cross-talk.

Likewise, the third apparatus 800(3) includes the third adiabatic $TE_0$ mode add/drop filter (modemux) 100(3), a third Bragg 810(3), and a third $TE_1 \rightarrow TE_0$ mode converter 850(3). The third $TE_0$ add/drop filter 100(3) includes the third lower waveguide 130(3) (e.g., a single-mode Si waveguide) that is configured to receive the second (pass-band) $TE_0$ mode optical signal having the other wavelengths (e.g., $\lambda_3$, $\lambda_4$) other than the second wavelength ($\lambda_2$) from the second Bragg 810(2) via the second transition 814(2) and the waveguides 816(2), 818(2). The third $TE_0$ add/drop filter 100(3) also includes a third bus waveguide 120(3) (e.g., a multimode SiN waveguide) that is connected with the third Bragg 810(3) and is configured to (modemux and) transmit the second (pass-band) $TE_0$ mode optical signal at the other wavelengths ($\lambda_3$, $\lambda_4$) to the third Bragg 810(3), without converting the second (pass-band) $TE_0$ mode optical signal ($\lambda_3$, $\lambda_4$) to another mode (e.g., $TE_1$). The third Bragg 810(3) receives the second (pass-band) $TE_0$ mode optical signal ($\lambda_3$, $\lambda_4$) from the third $TE_0$ add/drop filter 100(3) on the third bus waveguide 120(3), and reflects a first portion of the second (pass-band) $TE_0$ mode optical signal having a third wavelength ($\lambda_3$) back to the third $TE_0$ add/drop filter 100(3) on the third bus waveguide 120(3), while also converting this optical signal to a third (drop-band) $TE_1$ mode optical signal having the third wavelength ($\lambda_3$). The third $TE_0$ add/drop filter 100(3) receives the reflected third (drop-band) $TE_1$ mode optical signal at the third wavelength ($\lambda_3$) from the third Bragg 810(3) on the third bus waveguide 120(3), and (modemuxes and) transmits the reflected third (drop-band) $TE_1$ mode optical signal ($\lambda_3$) on the third bus waveguide 120(2) towards a third photodetector (GePD) 870(3) (i.e., via the third mode converter 850(3)), without converting the third (drop-band) $TE_1$ mode optical signal ($\lambda_3$) to another mode (e.g., $TE_0$).

The third $TE_1 \rightarrow TE_0$ mode converter 850(3) receives the third (drop-band) $TE_1$ mode optical signal at the third wavelength ($\lambda_3$) from the third $TE_0$ add/drop filter 100(3) on the third bus waveguide 120(3), converts the third (drop-band) $TE_1$ mode optical signal having the third wavelength ($\lambda_3$) to a third (drop-band) $TE_0$ mode optical signal having the third wavelength ($\lambda_3$), and transmits the converted third (drop-band) $TE_0$ mode optical signal ($\lambda_3$) to the third photodetector (GePD) 870(3) on the waveguide 852(3), where the third photodetector (GePD) 870(3) receives and detects the converted third (drop-band) $TE_0$ mode optical signal at the third wavelength ($\lambda_3$) that is received from the third mode converter 850(3). The third Bragg 810(3) is further connected with a third inter-layer transition 814(3) via a waveguide 812(3) (e.g., a multimode SiN waveguide), and transmits a third (pass-band) $TE_0$ mode optical signal to the third transition 814(3) on the waveguide 812(3), where the third (pass-band) $TE_0$ mode optical signal corresponds to a second portion of the second (pass-band) $TE_0$ mode optical signal having other wavelengths (e.g., $\lambda_4$) other than the third wavelength ($\lambda_3$) that is not reflected by (and passes through) the third Bragg 810(3). The third transition 814(3) receives the third (pass-band) $TE_0$ mode optical signal ($\lambda_4$) on the waveguide 812(3), and transmits the third (pass-band)

TE$_0$ mode optical signal ($\lambda_4$) (which, in this example corresponds to a fourth (drop-band) TE$_0$ mode optical signal having the fourth wavelength ($\lambda_4$)) to a fourth photodetector (GePD) 870(4) on the waveguide 816(3) (e.g., a single-mode Si waveguide), where the fourth photodetector 870(4) receives and detects the third (pass-band) TE$_0$ mode optical signal having the fourth wavelength ($\lambda_4$) (i.e., receives and detects the fourth (drop-band) TE$_0$ mode optical signal having the fourth wavelength ($\lambda_4$)). Thus, the third apparatus 800(3) reflects and detects a (drop-band) optical signal having a third wavelength ($\lambda_3$) in the third stage, while allowing a (pass-band) optical signal having the other wavelengths ($\lambda_4$) to pass through for further processing (to the fourth photodetector 870(4) that detects the fourth (drop-band) TE$_0$ optical signal having the fourth wavelength ($\lambda_4$)), and effectively limiting cross-talk.

Although three stages including three apparatuses 800 (Bragg-based demultiplexers, with three adiabatic TE$_0$ mode add/drop filters (modemuxes) 100, three Braggs 810, and three TE$_1$→TE$_0$ mode converters 850) are shown in FIG. 10, this is intended to be illustrative only and is non-limiting in nature. Other example embodiments could comprise fewer or more (two, fourth, five, etc.) stages and corresponding apparatuses 800, depending on the specific implementation and/or the number of distinct wavelengths (as) to be detected, for example.

As shown in FIG. 10, three Bragg-based demultiplexers 800 (e.g., apparatus 800(1), 800(2), 800(3) of FIG. 10 with Braggs 810(1), 810(2), and 810(3), respectively) are utilized in a full Bragg-based WDM architecture 1000, where each Bragg-based demultiplexer 800 is connected using silicon (Si) waveguides forming 180 degree bends (e.g., 180 degree Si clothoids 818(1), 818(2) of FIG. 10). Since the adiabatic TE$_0$ mode add/drop filter (modemux) 100 has a silicon (Si) input (lower waveguide 130), an added benefit of the proposed architectures described herein is that a silicon→nitride interlayer transition (or "Si→SiN transition") is not needed, since it is already built into the TE$_0$ mode add/drop filter 100. As described above with reference to FIGS. 1, 2A-2C, 3A-3B, and 4A-4B, an example implementation of a modemux 100 of FIG. 8 (the "TE$_0$ mode add/drop filters" 100(1), 100(2), 100(3) of FIG. 10) is expected to have cross-talk (TE$_0$↔TE$_1$) of <−45 dB, an insertion loss (excluding propagation loss)<0.03 dB, and a total length of about ~100 um.

The proposed full Bragg-based WDM architecture shown in FIG. 10 (apparatus 1000, with three Bragg-based demultiplexers 800) and described above assumes the usage of the following components: (1) the example implementation of the "adiabatic TE$_0$ mode add/drop filter" 100 for modemux 100) described above with reference to FIGS. 1, 2A-2B, 3A-3B, and 4A-4B, and (2) the example implementation of the "TE$_1$→TE$_0$ mode converter" 950(A) (option A for mode converter 850) described above with reference to FIG. 9A. However, this is merely intended to be illustrative and non-limiting in nature, and other example implementations are also possible, such as the second example embodiment of the modemux 100 described above with reference to FIGS. 5A-5B, and/or the "TE$_1$→TE$_0$ mode converter" 950 (B) or 950(C) (options B or C for mode converter 850) described above with reference to FIGS. 9B and 9C), for example.

Figure 11:
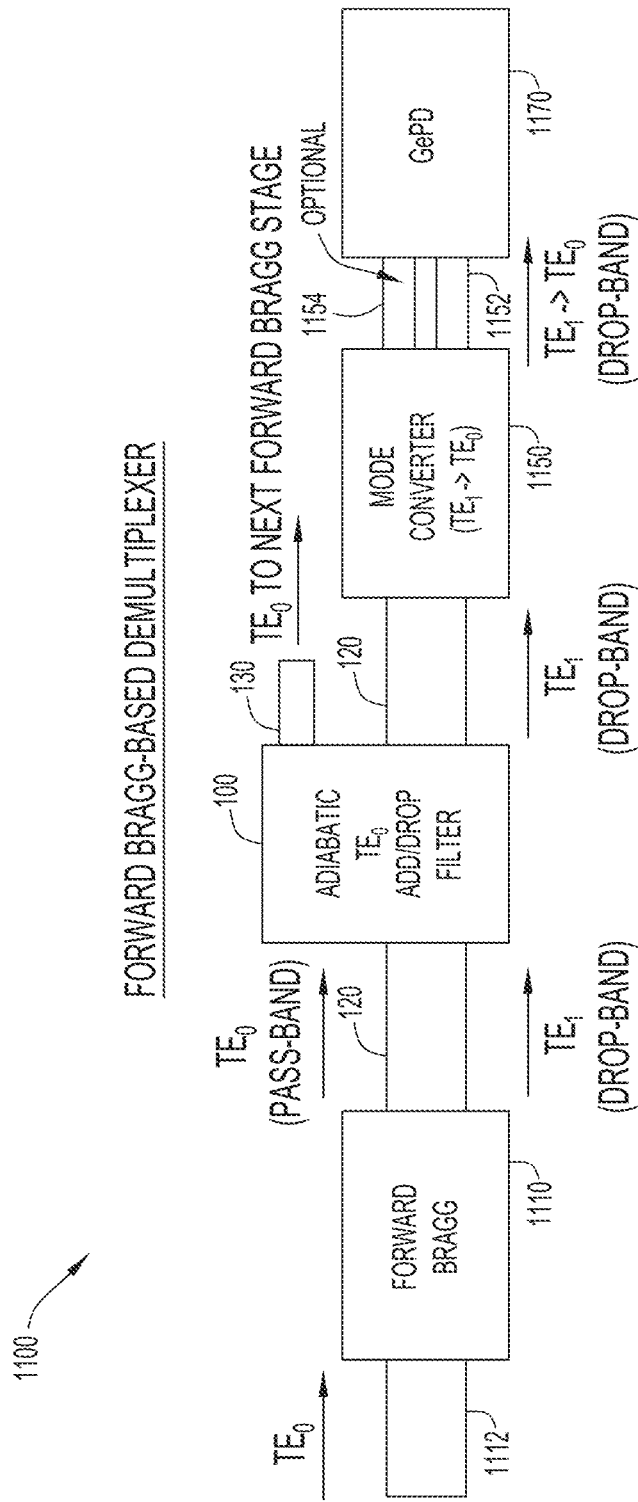
FIG. 11 is a block diagram of another use case device including a $TE_0$ mode add/drop filter (modemux), a forward Bragg, and a $TE_1 \rightarrow TE_0$ mode converter to provide a Bragg-based demultiplexer, according to an example embodiment.

FIG. 11 is a block diagram of another use case device for an adiabatic TE$_0$ mode add/drop filter (modemux) 100 to provide a forward Bragg-based demultiplexer, according to an example embodiment. As shown in FIG. 11, the forward Bragg-based demultiplexer 1100 (or simply, apparatus 1100) includes a forward Bragg grating 1110, an adiabatic TE$_0$ mode add/drop filter (modemux) 100, and a mode converter 1150 (i.e., TE$_1$→TE$_0$). The mode converter 1150 is connected to a photodetector (GePD) 1170 via one or more waveguides 1152, 1154 (the waveguide 1154 may be optional in some example embodiments). Similar to the mode converter 850 of FIG. 8, the mode converter 1150 of FIG. 11 may be implemented by any of the mode converters 950(A), 950(B) and/or 950(C) of FIGS. 9A-9C, for example. The proposed architecture of FIG. 11 (apparatus 1100, with a forward Bragg 1110) functions very similarly to the proposed architecture of FIG. 8 (apparatus 800, with a backward-reflecting Bragg 810), except that the forward Bragg 1110 of FIG. 11 scatters forward-propagating TE$_0$ (received via waveguide 1112) to forward-propagating TE$_1$, and consequently, the adiabatic components (e.g., TE$_0$ add/drop filter 100 and TE$_1$→TE$_0$ mode converter 1150) precede the Bragg in this example embodiment. In the forward Bragg-based demultiplexing scheme of FIG. 11, return loss is not of significant concern; rather, an ultra-low cross-talk mux may be employed to ensure minimal channel cross-talk.

Thus, as described above with reference to FIGS. 8, 9A-9C, 10 and 11, the present disclosure describes various proposed architectures (e.g., Bragg-based demultiplexer 800 of FIG. 8, full Bragg-based WDM architecture 1000 of FIG. 10, and/or forward Bragg-based demultiplexer 1100 of FIG. 11) that facilitate low cross-talk and are expected to remove return loss (RL) challenges, while minimizing the device footprint and keeping insertion loss (IL) low.

Figure 12A:
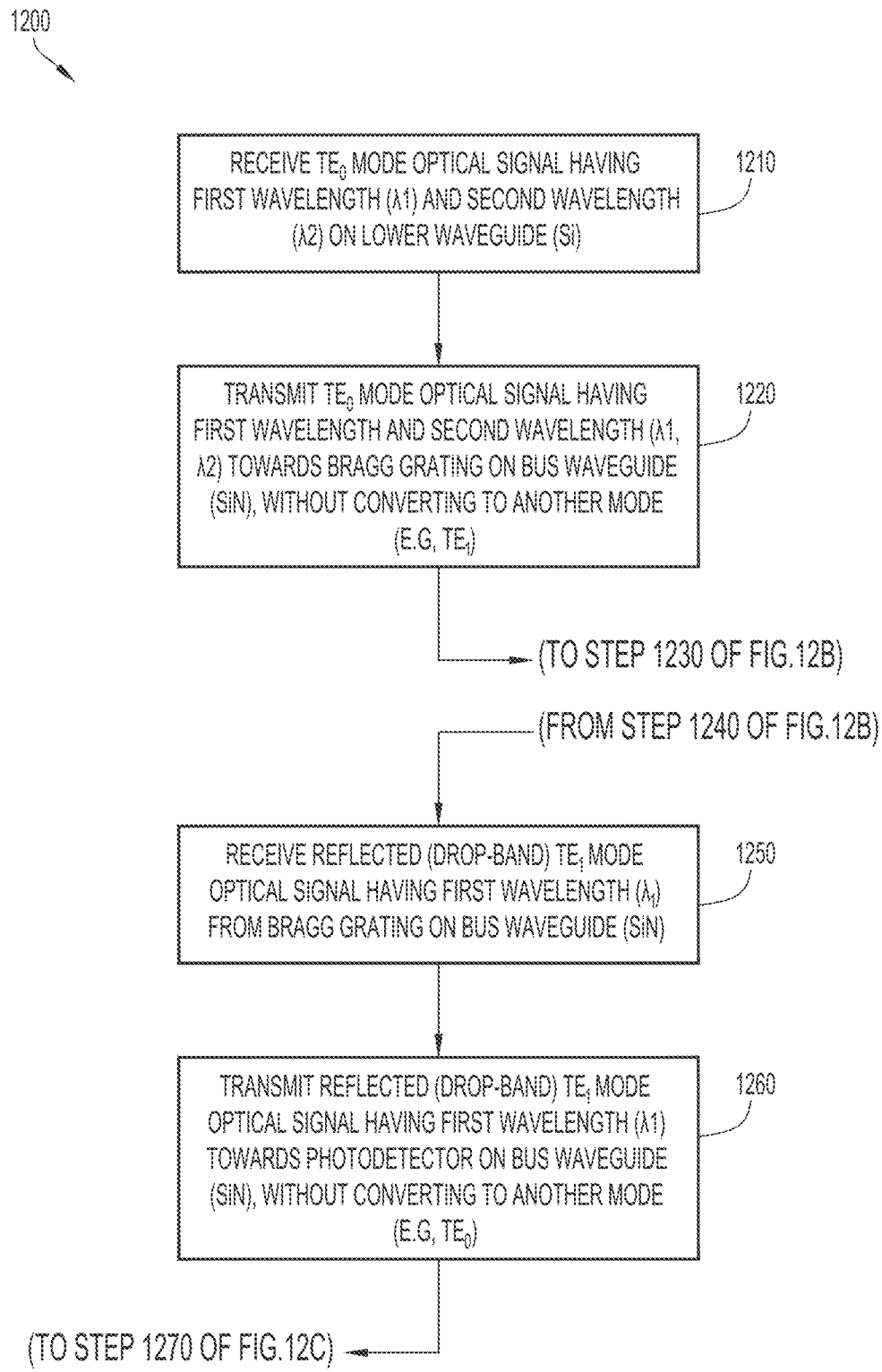
Figure 12C:
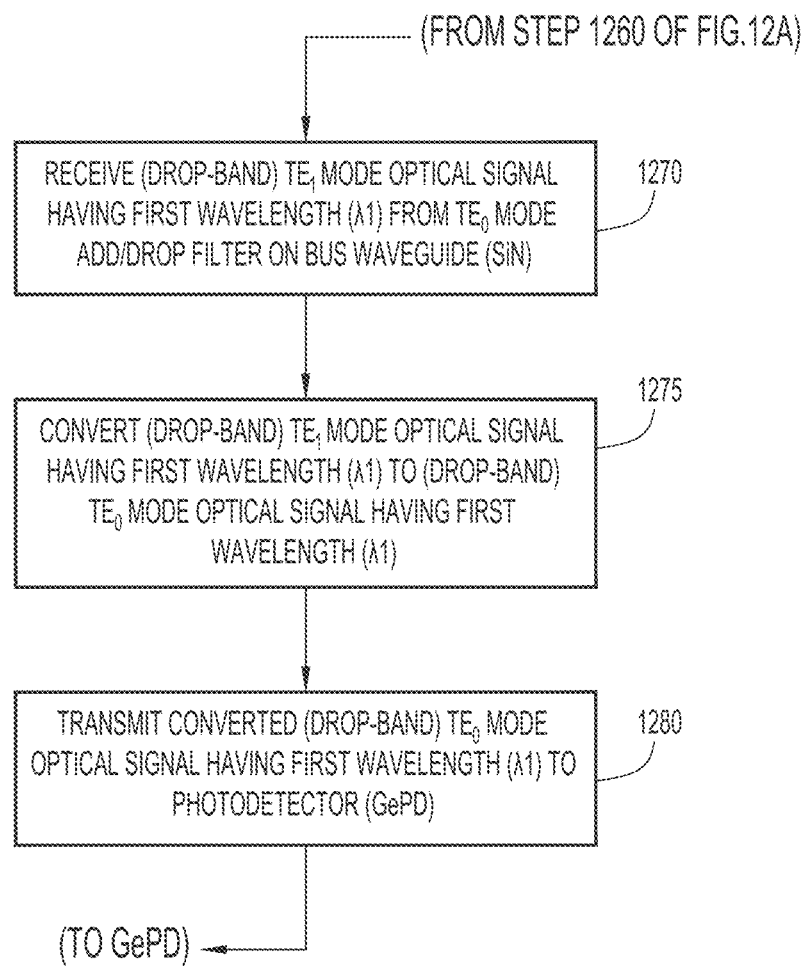

FIGS. 12A-12C illustrate a flowchart showing a method 1200 that includes a series of operations for processing light with a Bragg-based demultiplexer 800 of FIG. 8, with an integrated adiabatic TE$_0$ mode add/drop filter (modemux) 100 and Bragg grating 810, as well as a TE$_1$→TE$_0$ mode converter 850 that operates independently of the TE$_0$ mode add/drop filter 100, according to an example embodiment. FIG. 12A shows operations from the perspective of the TE$_0$ mode add/drop filter 100, FIG. 12B shows operations from the perspective of the Bragg grating 810, and FIG. 12C shows operations from the perspective of the TE$_1$→TE$_0$ mode converter 850.

As shown in FIG. 12A, at step 1210, a TE$_0$ mode add/drop filter (e.g., the TE$_0$ mode add/drop filter 100 of FIG. 8) receives a TE$_0$ mode optical signal on a lower waveguide (e.g., a single-mode (Si) waveguide 130), where the TE$_0$ mode optical signal has at least a first wavelength ($\lambda_1$) and a second wavelength ($\lambda_2$) (i.e., light modulating at different frequencies (e.g., $\lambda_1, \lambda_2, \ldots, \lambda_N$)). At step 1220, the TE$_0$ add/drop filter transmits the TE$_0$ mode optical signal having the first wavelength and the second wavelength ($\lambda_1, \lambda_2$) towards a Bragg grating (e.g., the Bragg grating 810 of FIG. 8) on a bus waveguide (e.g., a multimode (SiN) waveguide 120) disposed above the lower waveguide. In step 1220, the TE$_0$ add/drop filter modemuxes and transmits without converting the TE$_0$ mode optical signal having the first wavelength and the second wavelength ($\lambda_1, \lambda_2$) to another mode (e.g., TE$_1$).

As shown in FIG. 12B, at step 1230, the Bragg grating receives the TE$_0$ mode optical signal having the first wavelength and the second wavelength ($\lambda_1, \lambda_2$) from the TE$_0$ add/drop filter on the bus waveguide (SiN). At step 1240, the Bragg grating transmits a reflected (drop-band) TE mode optical signal to the TE$_0$ mode add/drop filter on the bus waveguide (SiN). The reflected (drop-band) TE$_1$ mode optical signal corresponds to a first portion of the TE$_0$ mode optical signal having the first wavelength ($\lambda_1$) that is reflected by the Bragg grating back to the TE$_0$ mode add/ drop filter, where the operation of reflecting converts the first portion of the $TE_0$ mode optical signal having the first wavelength ($\lambda_1$) to the reflected (drop-band) $TE_1$ mode optical signal having the first wavelength ($\lambda_1$).

Also shown in FIG. 12B, at step 1235 (which may occur before, after, or concurrently with step 1240), the Bragg grating transmits a non-reflected (pass-band) $TE_0$ mode optical signal having the second wavelength ($\lambda_2$) towards a second $TE_0$ mode add/drop filter. The non-reflected (pass-band) $TE_0$ mode optical signal having the second wavelength ($\lambda_2$) corresponds to a second portion of the $TE_0$ mode optical signal having one or more other wavelengths (e.g., $\lambda_2, \ldots, \lambda_N$) other than the first wavelength ($\lambda_1$), that is not reflected by (and passes through) the Bragg grating. For example, the Bragg grating may transmit the non-reflected (pass-band) $TE_0$ mode optical signal having the second wavelength ($\lambda_2$) to the second $TE_0$ mode add/drop filter via a transition (e.g., inter-layer transition 814 on a multimode (SiN) waveguide 812 of FIG. 8), for further transmission (by the second $TE_0$ mode add/drop filter), reflection (by a second Bragg grating), conversion (by a second TE1-TE0 mode converter), and/or processing (by a second photodetector configured to detect the second wavelength ($\lambda_2$)).

Referring again to FIG. 12A, at step 1250, the $TE_0$ mode add/drop filter receives the reflected (drop-band) $TE_1$ mode optical signal having the first wavelength ($\lambda_1$) from the Bragg grating on the bus waveguide (SiN). At step 1260, the $TE_0$ mode add/drop filter transmits the reflected (drop-band) $TE_1$ mode optical signal having the first wavelength ($\lambda_1$) towards a photodetector (e.g., the photodetector (GePD) 870 of FIG. 8) on the bus waveguide (SiN). In step 1260, the $TE_0$ mode add/drop filter modemuxes and transmits without converting the (drop-band) $TE_1$ mode optical signal ($\lambda_1$) to another mode (e.g., $TE_0$).

As shown in FIG. 12C, at step 1270, a $TE_1 \rightarrow TE_0$ mode converter (e.g., $TE_1 \rightarrow TE_0$ mode converter 850 of FIG. 8) receives the (drop-band) $TE_1$ mode optical signal having the first wavelength ($\lambda_1$) from the $TE_0$ add/drop filter on the bus waveguide (SiN). At step 1275, the $TE_1 \rightarrow TE_0$ mode converter converts the (drop-band) $TE_1$ mode optical signal having the first wavelength ($\lambda_1$) to a (drop-band) $TE_0$ mode optical signal having the first wavelength ($\lambda_1$). At step 1280, the $TE_1 \rightarrow TE_0$ mode converter transmits the converted (drop-band) $TE_0$ mode optical signal having the first wavelength ($\lambda_1$) to the photodetector (e.g., to the photodetector (GePD) 870 on the single-mode (Si) waveguide 852 of FIG. 8). The photodetector then receives and detects (processes) the converted (drop-band) $TE_0$ mode optical signal having the first wavelength ($\lambda_1$) that is received from the $TE_1 \rightarrow TE_0$ mode converter.

In the example of FIG. 12A, the $TE_0$ mode add/drop filter (modemux) component is configured to mode multiplex $TE_1$ mode optical signals and $TE_0$ mode optical signals, without converting either the $TE_0$ mode optical signal or the $TE_1$ mode optical signal to a different mode, respectively. The conversion operation is performed separately by the $TE_1 \rightarrow TE_0$ mode converter component, as shown in the example of FIG. 12C. The structure and operation of the $TE_0$ mode add/drop filter are designed to prevent/avoid $TE_1$-$TM_0$ mode hybridization of an optical signal that traverses the bus waveguide (multimode SiN waveguide), for example.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method including: receiving, at a $TE_0$ mode add/drop filter, a $TE_0$ mode optical signal having a first wavelength and a second wavelength; transmitting, from the $TE_0$ mode add/drop filter, the $TE_0$ mode optical signal having the first wavelength and the second wavelength towards a Bragg grating, without converting the $TE_0$ mode optical signal having the first wavelength and the second wavelength to another mode; receiving, at the $TE_0$ mode add/drop filter, a reflected $TE_1$ mode optical signal having the first wavelength from the Bragg grating; and transmitting, from the $TE_0$ mode add/drop filter, the reflected $TE_1$ mode optical signal having the first wavelength towards a photodetector, without converting the reflected $TE_1$ mode optical signal having the first wavelength to another mode.

In some aspects, the $TE_0$ mode add/drop filter is an adiabatic $TE_0$ mode add/drop filter.

In some aspects, the method further includes: receiving the $TE_0$ mode optical signal having the first wavelength and the second wavelength on a lower waveguide; and transmitting the $TE_0$ mode optical signal having the first wavelength and the second wavelength towards the Bragg grating on a bus waveguide disposed above the lower waveguide.

In some aspects, the method further includes: receiving the reflected $TE_1$ mode optical signal having the first wavelength from the Bragg grating on the bus waveguide; and transmitting the reflected $TE_1$ mode optical signal having the first wavelength towards the photodetector on the bus waveguide.

In some aspects, the lower waveguide is a single-mode waveguide comprised of silicon (Si) and the bus waveguide is a multimode waveguide comprised of silicon nitride.

In some aspects, the method further includes: establishing a pseudo-symmetry about a longitudinal axis of the bus waveguide to prevent $TE_1$-$TM_0$ mode hybridization of optical signals that traverse the bus waveguide.

In some aspects, the method further includes: mode multiplexing, by the $TE_0$ mode add/drop filter, the $TE_0$ mode optical signal having the first wavelength and the second wavelength with the reflected $TE_1$ mode optical signal having the first wavelength.

In some aspects, the method further includes: receiving, at a $TE_1 \rightarrow TE_0$ mode converter, the reflected $TE_1$ mode optical signal having the first wavelength from the $TE_0$ mode add/drop filter; converting, by the $TE_1 \rightarrow TE_0$ mode converter, the reflected $TE_1$ mode optical signal having the first wavelength to a converted $TE_0$ mode optical signal having the first wavelength; and transmitting, from the $TE_1 \rightarrow TE_0$ mode converter, the converted $TE_0$ mode optical signal having the first wavelength to the photodetector.

In some aspects, the method further includes: transmitting, from the Bragg grating, a non-reflected (pass-band) $TE_0$ mode optical signal having the second wavelength towards a second $TE_0$ mode add/drop filter.

In some aspects, the techniques described herein relate to a method including: passing an optical signal through a plurality of $TE_0$ mode add/drop filters; reflecting respective wavelengths of the optical signal using respective Bragg gratings; and detecting powers of the respective wavelengths using respective photodetectors, wherein each $TE_0$ mode add/drop filter in the plurality of $TE_0$ mode add/drop filters passes the optical signal without converting the optical signal to a different mode. In some aspects, at least one $TE_0$ mode add/drop filter in the plurality of $TE_0$ mode add/drop filters is an adiabatic $TE_0$ mode add/drop filter.

In some aspects, the techniques described herein relate to an apparatus including: a $TE_0$ mode add/drop filter; and a Bragg grating connected with the $TE_0$ mode add/drop filter; wherein the $TE_0$ mode add/drop filter is configured to: receive a $TE_0$ mode optical signal having a first wavelength and a second wavelength; transmit the $TE_0$ mode optical signal having the first wavelength and the second wavelength towards the Bragg grating, without converting the $TE_0$ mode optical signal having the first wavelength and the second wavelength to another mode; receive a reflected $TE_1$ mode optical signal having the first wavelength from the Bragg grating; and transmit the reflected $TE_1$ mode optical signal having the first wavelength towards a photodetector, without converting the reflected $TE_1$ mode optical signal having the first wavelength to another mode.

In some aspects, the $TE_0$ mode add/drop filter is an adiabatic $TE_0$ mode add/drop filter.

In some aspects, the $TE_0$ mode add/drop filter is configured to: receive the $TE_0$ mode optical signal having the first wavelength and the second wavelength on a lower waveguide; and transmit the $TE_0$ mode optical signal having the first wavelength and the second wavelength towards the Bragg grating on a bus waveguide disposed above the lower waveguide.

In some aspects, the $TE_0$ mode add/drop filter is configured to: receive the reflected $TE_1$ mode optical signal having the first wavelength from the Bragg grating on the bus waveguide; and transmit the reflected $TE_1$ mode optical signal having the first wavelength towards the photodetector on the bus waveguide.

In some aspects, the lower waveguide is a single-mode waveguide comprised of silicon (Si) and the bus waveguide is a multimode waveguide comprised of silicon nitride.

In some aspects, the techniques described herein relate to an apparatus, wherein the $TE_0$ mode add/drop filter further establishes a pseudo-symmetry about a longitudinal axis of the bus waveguide to prevent $TE_1$-$TM_0$ mode hybridization of optical signals that traverse the bus waveguide.

In some aspects, the techniques described herein relate to an apparatus, wherein the $TE_0$ mode add/drop filter is configured to mode multiplex the $TE_0$ mode optical signal having the first wavelength and the second wavelength with the reflected $TE_1$ mode optical signal having the first wavelength.

In some aspects, the techniques described herein relate to an apparatus, further including: a $TE_1 \rightarrow TE_0$ mode converter configured to: receive the reflected $TE_1$ mode optical signal having the first wavelength from the $TE_0$ mode add/drop filter; convert the reflected $TE_1$ mode optical signal having the first wavelength to a converted $TE_0$ mode optical signal having the first wavelength; and transmit the converted $TE_0$ mode optical signal having the first wavelength to the photodetector.

In some aspects, the techniques described herein relate to an apparatus, wherein the Bragg grating is configured to transmit a non-reflected $TE_0$ mode optical signal having the second wavelength towards a second $TE_0$ add/drop filter.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving, at a $TE_0$ mode add/drop filter, a $TE_0$ mode optical signal having a first wavelength and a second wavelength;
   transmitting, from the $TE_0$ mode add/drop filter, the $TE_0$ mode optical signal having the first wavelength and the second wavelength towards a Bragg grating, without converting the $TE_0$ mode optical signal having the first wavelength and the second wavelength to another mode;
   receiving, at the $TE_0$ mode add/drop filter, a reflected $TE_1$ mode optical signal having the first wavelength from the Bragg grating; and
   transmitting, from the $TE_0$ mode add/drop filter, the reflected $TE_1$ mode optical signal having the first wavelength towards a photodetector, without converting the reflected $TE_1$ mode optical signal having the first wavelength to another mode,
   wherein the $TE_0$ mode add/drop filter comprises:
      a bus waveguide;
      a lower waveguide disposed on a first side of the bus waveguide; and
      an upper waveguide disposed on a second side of the bus waveguide opposite to the first side of the bus waveguide,
      wherein the upper waveguide follows at least a portion of a path of the lower waveguide, and opposing longitudinal edges of both the lower waveguide and the upper waveguide, along the at least a portion of the path, are located between longitudinal edges of the bus waveguide.

2. The method of claim 1, wherein the $TE_0$ mode add/drop filter is an adiabatic $TE_0$ mode add/drop filter.

3. The method of claim 1, further comprising:
   receiving the $TE_0$ mode optical signal having the first wavelength and the second wavelength on the lower waveguide; and
   transmitting the $TE_0$ mode optical signal having the first wavelength and the second wavelength towards the Bragg grating on the bus waveguide disposed above the lower waveguide.

4. The method of claim 3, further comprising:
   receiving the reflected $TE_1$ mode optical signal having the first wavelength from the Bragg grating on the bus waveguide; and
   transmitting the reflected $TE_1$ mode optical signal having the first wavelength towards the photodetector on the bus waveguide.

5. The method of claim 4, wherein the lower waveguide is a single-mode waveguide comprised of silicon and the bus waveguide is a multimode waveguide comprised of silicon nitride.

6. The method of claim 5, further comprising:
   establishing, using the upper waveguide, a pseudo-symmetry about a longitudinal axis of the bus waveguide to prevent $TE_1$-$TM_0$ mode hybridization of optical signals that traverse the bus waveguide.

7. The method of claim 1, further comprising:
mode multiplexing, by the $TE_0$ mode add/drop filter, the $TE_0$ mode optical signal having the first wavelength and the second wavelength with the reflected $TE_1$ mode optical signal having the first wavelength.

8. The method of claim 1, further comprising:
receiving, at a $TE_1 \rightarrow TE_0$ mode converter, the reflected $TE_1$ mode optical signal having the first wavelength from the $TE_0$ mode add/drop filter;
converting, by the $TE_1 \rightarrow TE_0$ mode converter, the reflected $TE_1$ mode optical signal having the first wavelength to a converted $TE_0$ mode optical signal having the first wavelength; and
transmitting, from the $TE_1 \rightarrow TE_0$ mode converter, the converted $TE_0$ mode optical signal having the first wavelength to the photodetector.

9. The method of claim 1, further comprising:
transmitting, from the Bragg grating, a non-reflected $TE_0$ mode optical signal having the second wavelength towards a second $TE_0$ mode add/drop filter.

10. An apparatus comprising:
a $TE_0$ mode add/drop filter; and
a Bragg grating connected with the $TE_0$ mode add/drop filter;
wherein the $TE_0$ mode add/drop filter is configured to:
receive a $TE_0$ mode optical signal having a first wavelength and a second wavelength;
transmit the $TE_0$ mode optical signal having the first wavelength and the second wavelength towards the Bragg grating, without converting the $TE_0$ mode optical signal having the first wavelength and the second wavelength to another mode;
receive a reflected $TE_1$ mode optical signal having the first wavelength from the Bragg grating; and
transmit the reflected $TE_1$ mode optical signal having the first wavelength towards a photodetector, without converting the reflected $TE_1$ mode optical signal having the first wavelength to another mode,
wherein the $TE_0$ mode add/drop filter comprises:
a bus waveguide;
a lower waveguide disposed on a first side of the bus waveguide; and
an upper waveguide disposed on a second side of the bus waveguide opposite to the first side of the bus waveguide,
wherein the upper waveguide follows at least a portion of a path of the lower waveguide, and opposing longitudinal edges of both the lower waveguide and the upper waveguide, along the at least a portion of the path, are located between longitudinal edges of the bus waveguide.

11. The apparatus of claim 10, wherein the $TE_0$ mode add/drop filter is an adiabatic $TE_0$ mode add/drop filter.

12. The apparatus of claim 10, wherein the $TE_0$ mode add/drop filter is configured to:
receive the $TE_0$ mode optical signal having the first wavelength and the second wavelength on the lower waveguide; and
transmit the $TE_0$ mode optical signal having the first wavelength and the second wavelength towards the Bragg grating on the bus waveguide disposed above the lower waveguide.

13. The apparatus of claim 12, wherein the $TE_0$ mode add/drop filter is configured to:
receive the reflected $TE_1$ mode optical signal having the first wavelength from the Bragg grating on the bus waveguide; and
transmit the reflected $TE_1$ mode optical signal having the first wavelength towards the photodetector on the bus waveguide.

14. The apparatus of claim 13, wherein the lower waveguide is a single-mode waveguide comprised of silicon and the bus waveguide is a multimode waveguide comprised of silicon nitride.

15. The apparatus of claim 14, wherein the $TE_0$ mode add/drop filter further establishes, using the upper waveguide, a pseudo-symmetry about a longitudinal axis of the bus waveguide to prevent $TE_1$-$TM_0$ mode hybridization of optical signals that traverse the bus waveguide.

16. The apparatus of claim 10, wherein the $TE_0$ mode add/drop filter is configured to mode multiplex the $TE_0$ mode optical signal having the first wavelength and the second wavelength with the reflected $TE_1$ mode optical signal having the first wavelength.

17. The apparatus of claim 12, further comprising:
a $TE_1 \rightarrow TE_0$ mode converter configured to:
receive the reflected $TE_1$ mode optical signal having the first wavelength from the $TE_0$ mode add/drop filter;
convert the reflected $TE_1$ mode optical signal having the first wavelength to a converted $TE_0$ mode optical signal having the first wavelength; and
transmit the converted $TE_0$ mode optical signal having the first wavelength to the photodetector.

18. The apparatus of claim 10, wherein the Bragg grating is configured to transmit a non-reflected TE0 mode optical signal having the second wavelength towards a second TE0 add/drop filter.

19. A method comprising:
receiving a $TE_0$ mode optical signal having a first wavelength and a second wavelength;
transmitting the $TE_0$ mode optical signal having the first wavelength and the second wavelength towards a Bragg grating, without converting the $TE_0$ mode optical signal having the first wavelength and the second wavelength to another mode;
receiving a reflected $TE_1$ mode optical signal having the first wavelength from the Bragg grating; and
transmitting the reflected $TE_1$ mode optical signal having the first wavelength towards a photodetector, without converting the reflected $TE_1$ mode optical signal having the first wavelength to another mode,
wherein receiving the $TE_0$ mode optical signal having a first wavelength and a second wavelength comprises receiving the $TE_0$ mode optical signal having a first wavelength and a second wavelength at a $TE_0$ mode add/drop filter, which comprises:
a bus waveguide;
a lower waveguide disposed on a first side of the bus waveguide; and
an upper waveguide disposed on a second side of the bus waveguide opposite to the first side of the bus waveguide,
wherein the upper waveguide follows at least a portion of a path of the lower waveguide, and opposing longitudinal edges of both the lower waveguide and the upper waveguide, along the at least a portion of the path, are located between longitudinal edges of the bus waveguide.

20. The method of claim 19, wherein receiving the $TE_0$ mode optical signal, transmitting the $TE_0$ mode optical signal, receiving reflected $TE_1$ mode optical signal, and transmitting the reflected $TE_1$ mode optical signal are performed by the $TE_0$ mode add/drop filter.

* * * * *